(12) United States Patent
Sawada et al.

(10) Patent No.: US 10,217,565 B2
(45) Date of Patent: Feb. 26, 2019

(54) ELECTRONIC COMPONENT

(71) Applicant: Murata Manufacturing Co., Ltd., Nagaokakyo-shi, Kyoto-fu (JP)

(72) Inventors: Takashi Sawada, Nagaokakyo (JP); Yasuo Fujii, Nagaokakyo (JP); Takayuki Kayatani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/613,491

(22) Filed: Jun. 5, 2017

(65) Prior Publication Data

US 2017/0352479 A1   Dec. 7, 2017

(30) Foreign Application Priority Data

Jun. 6, 2016 (JP) .................................. 2016-112715

(51) Int. Cl.
| | |
|---|---|
| H01G 4/00 | (2006.01) |
| H01G 4/30 | (2006.01) |
| H01G 4/12 | (2006.01) |
| H01G 4/008 | (2006.01) |
| H01G 4/232 | (2006.01) |
| H01G 4/228 | (2006.01) |
| H01G 4/06 | (2006.01) |

(52) U.S. Cl.
CPC .......... *H01G 4/1245* (2013.01); *H01G 4/008* (2013.01); *H01G 4/232* (2013.01); *H01G 4/2325* (2013.01); *H01G 4/30* (2013.01); *H01G 4/06* (2013.01); *H01G 4/12* (2013.01); *H01G 4/228* (2013.01)

(58) Field of Classification Search
CPC .. H01G 4/06; H01G 4/08; H01G 4/12; H01G 4/228; H01G 4/232; H01G 4/01; H01G 4/005; H01G 4/002; H01G 4/30; H01G 4/00; H01G 5/011
USPC ... 361/278, 301.1, 301.4, 303, 306.1, 306.3, 361/307, 308.1, 321.2, 321.3, 504, 520
See application file for complete search history.

(56) References Cited

U.S. PATENT DOCUMENTS

| | | |
|---|---|---|
| 2013/0058006 A1 | 3/2013 | Kim |
| 2013/0135788 A1 | 5/2013 | Park et al. |
| 2013/0250476 A1* | 9/2013 | Chung ..................... H01G 4/30 361/303 |

(Continued)

FOREIGN PATENT DOCUMENTS

| | | |
|---|---|---|
| JP | 2013-201417 A | 10/2013 |
| KR | 10-2013-0025595 A | 3/2013 |

(Continued)

*Primary Examiner* — Binh B Tran
(74) *Attorney, Agent, or Firm* — Keating & Bennett, LLP

(57) ABSTRACT

An electronic component includes a multilayer body, first to fourth outer electrodes, a pair of first insulating coating portions, and a pair of second insulating coating portions. The pair of first insulating coating portions is in at least one of a state in which inner end portions are in contact with the third outer electrode and a state in which outer end portions are in contact with the first outer electrode and the second outer electrode. The pair of second insulating coating portions is in at least one of a state in which inner end portions are in contact with the fourth outer electrode and a state in which outer end portions are in contact with the first outer electrode and the second outer electrode.

28 Claims, 23 Drawing Sheets

(56) References Cited

U.S. PATENT DOCUMENTS

2014/0160615 A1   6/2014  Lee et al.
2017/0223833 A1*  8/2017  Lee ....................... H05K 1/181

FOREIGN PATENT DOCUMENTS

KR   10-2013-0060503 A   6/2013
KR   10-2014-0073140 A   6/2014

* cited by examiner

ELECTRONIC COMPONENT

CROSS REFERENCE TO RELATED APPLICATIONS

This application claims the benefit of priority to Japanese Patent Application No. 2016-112715 filed on Jun. 6, 2016. The entire contents of this application are hereby incorporated herein by reference.

BACKGROUND OF THE INVENTION

1. Field of the Invention

The present invention relates to an electronic component, and more particularly, to an electronic component including a multilayer body including dielectric layers and inner electrode layers that are alternately laminated.

2. Description of the Related Art

Japanese Unexamined Patent Application Publication No. 2013-201417 is an example of a document that discloses a multilayer ceramic capacitor as a related-art electronic component.

The multilayer ceramic capacitor disclosed in Japanese Unexamined Patent Application Publication No. 2013-201417 includes a ceramic element assembly having a pair of end surfaces, a pair of lateral surfaces, and a pair of principal surfaces, a first outer electrode provided on one of the pair of end surfaces, a second outer electrode provided on the other one of the pair of end surfaces, a third outer electrode provided on one of the pair of lateral surfaces, and a fourth outer electrode provided on the other one of the pair of lateral surfaces. The ceramic element assembly includes a first inner electrode layer that connects the first outer electrode and the second outer electrode to each other, and a second inner electrode layer that connects the third outer electrode and the fourth outer electrode to each other. The second inner electrode layer includes an opposed electrode portion that faces the first inner electrode layer, and extended electrode portions that are extended from the opposed electrode portion toward the third outer electrode and the fourth outer electrode. The end portion of the extended electrode portion located close to one of the pair of lateral surfaces is covered with the third outer electrode so as not to be exposed to the outside, and the end portion of the extended electrode portion located close to the other one of the pair of lateral surfaces is covered with the fourth outer electrode so as not to be exposed to the outside.

In the multilayer ceramic capacitor disclosed in Japanese Unexamined Patent Application Publication No. 2013-201417, however, the lengths of the end portions of the extended electrode portions in a length direction in which the pair of end surfaces are arranged need to be set smaller than the length of the third outer electrode and the length of the fourth outer electrode in the length direction so as to prevent the end portions of the extended electrode portions from being exposed to the outside in view of reliability.

In this case, the distance along the length direction between the end portion of the first inner electrode layer which is located on the first outer electrode side and each of the extended electrode portions of the second inner electrode layer increases and the distance along the length direction between the end portion of the first inner electrode layer which is located on the second outer electrode side and each of the extended electrode portions of the second inner electrode layer also increases.

Therefore, the size of, for example, a loop defined by a path of a current flowing through the first inner electrode layer from the first outer electrode side, reaching the second inner electrode layer, and further flowing through the extended electrode portions of the second inner electrode layer increases. As a result, equivalent series inductance (ESL) increases and an effect of removing high-frequency noise becomes weaker.

When an attempt is made to set the lengths of the end portions of the extended electrode portions close to the length of the third outer electrode and the length of the fourth outer electrode so as to reduce the distance along the length direction between the end portion of the first inner electrode layer which is located on the first outer electrode side and each of the extended electrode portions of the second inner electrode layer, the extended electrode portions may extend out of the regions of the third outer electrode and the fourth outer electrode in the length direction due to processing variations at the time of manufacturing. In this case, the extended electrode portions are exposed to the outside, with the result that the reliability of the multilayer ceramic capacitor decreases.

SUMMARY OF THE INVENTION

Preferred embodiments of the present invention provide electronic components that reduce ESL while securing reliability.

An electronic component according to a first preferred embodiment of the present invention includes a multilayer body including a first end surface and a second end surface located opposite each other in a length direction, a first lateral surface and a second lateral surface located opposite each other in a width direction perpendicular or substantially perpendicular to the length direction, and a first principal surface and a second principal surface located opposite each other in a thickness direction perpendicular or substantially perpendicular to the length direction and the width direction, a first outer electrode that reaches the first principal surface, the second principal surface, the first lateral surface, and the second lateral surface from the first end surface, a second outer electrode that reaches the first principal surface, the second principal surface, the first lateral surface, and the second lateral surface from the second end surface, a third outer electrode that is provided on the first lateral surface so as to be located between the first end surface and the second end surface in the length direction and reaches the first principal surface and the second principal surface from the first lateral surface, a fourth outer electrode that is provided on the second lateral surface so as to be located between the first end surface and the second end surface in the length direction and reaches the first principal surface and the second principal surface from the second lateral surface, a pair of first insulating coating portions that is provided so that the third outer electrode is located therebetween in the length direction and reaches the first principal surface and the second principal surface from the first lateral surface, and a pair of second insulating coating portions that is provided so that the fourth outer electrode is located therebetween in the length direction and reaches the first principal surface and the second principal surface from the second lateral surface. The multilayer body includes a plurality of dielectric layers and a plurality of inner electrode layers alternately laminated in a laminating direction that is the thickness direction. The plurality of inner electrode layers include a plurality of first inner electrode layers connected to the first outer electrode and the second outer electrode, and a plurality of second inner electrode layers connected to the third outer electrode and the fourth outer electrode. The pair of first insulating coating portions is in at least one of a state in which inner end portions of the pair of first insulating coating portions in the length direction are held in contact with the third outer electrode and a state in which outer end portions of the pair of first insulating coating portions in the length direction are held in contact with the first outer electrode and the second outer electrode. The pair of second insulating coating portions is located opposite the pair of first insulating coating portions in the width direction. The pair of second insulating coating portions is in at least one of a state in which inner end portions of the pair of second insulating coating portions in the length direction are held in contact with the fourth outer electrode and a state in which outer end portions of the pair of second insulating coating portions in the length direction are held in contact with the first outer electrode and the second outer electrode.

In the electronic component according to the first preferred embodiment, the pair of first insulating coating portions may be in the state in which the inner end portions of the pair of first insulating coating portions in the length direction are held in contact with the third outer electrode, and the pair of second insulating coating portions may be in the state in which the inner end portions of the pair of second insulating coating portions in the length direction are held in contact with the fourth outer electrode.

In the electronic component according to the first preferred embodiment, it is preferred that the second inner electrode layer include a first opposed electrode portion that faces the first inner electrode layer, a first extended electrode portion that extends from the first opposed electrode portion to the first lateral surface so as to reach the third outer electrode, and a second extended electrode portion that extends from the first opposed electrode portion to the second lateral surface so as to reach the fourth outer electrode. Further, an end portion of the first extended electrode portion located on the first lateral surface side may extend in the length direction out of a region where the third outer electrode is provided. In this case, it is preferred that the end portion be located within a region where the pair of first insulating coating portions and the third outer electrode are provided. Still further, an end portion of the second extended electrode portion located on the second lateral surface side may extend in the length direction out of a region where the fourth outer electrode is provided. In this case, it is preferred that the end portion be located within a region where the pair of second insulating coating portions and the fourth outer electrode are provided.

In the electronic component according to the first preferred embodiment, when viewed in the width direction, the inner end portions of the pair of first insulating coating portions in the length direction may cover the third outer electrode. Further, when viewed in the width direction, the inner end portions of the pair of second insulating coating portions in the length direction may cover the fourth outer electrode.

In the electronic component according to the first preferred embodiment, when viewed in the width direction, the inner end portions of the pair of first insulating coating portions in the length direction may be covered with the third outer electrode. Further, when viewed in the width direction, the inner end portions of the pair of second insulating coating portions in the length direction may be covered with the fourth outer electrode.

In the electronic component according to the first preferred embodiment, the pair of first insulating coating portions may be in the state in which the outer end portions of the pair of first insulating coating portions in the length direction are held in contact with the first outer electrode and the second outer electrode, and the pair of second insulating coating portions may be in the state in which the outer end portions of the pair of second insulating coating portions in the length direction are held in contact with the first outer electrode and the second outer electrode.

In the electronic component according to the first preferred embodiment, the first inner electrode layer may include a second opposed electrode portion that faces the second inner electrode layer, a third extended electrode portion that extends from the second opposed electrode portion to the first end surface so as to reach the first outer electrode, and a fourth extended electrode portion that extends from the second opposed electrode portion to the second end surface so as to reach the second outer electrode. Further, the third extended electrode portion may include a first extended end portion that is extended to the first lateral surface, and a second extended end portion that is extended to the second lateral surface, and the fourth extended electrode portion may include a third extended end portion that is extended to the first lateral surface, and a fourth extended end portion that is extended to the second lateral surface. Still further, in this case, it is preferred that the first extended end portion be located within a region on the first lateral surface where one first insulating coating portion out of the pair of first insulating coating portions which is located on the first end surface side and the first outer electrode are provided, and that the second extended end portion be located within a region on the second lateral surface where one second insulating coating portion out of the pair of second insulating coating portions which is located on the first end surface side and the first outer electrode are provided. Further, it is preferred that the third extended end portion be located within a region on the first lateral surface where another first insulating coating portion out of the pair of first insulating coating portions which is located on the second end surface side and the second outer electrode are provided, and that the fourth extended end portion be located within a region on the second lateral surface where another second insulating coating portion out of the pair of second insulating coating portions which is located on the second end surface side and the second outer electrode are provided.

In the electronic component according to the first preferred embodiment, when viewed in the width direction, one of the outer end portions of the pair of first insulating coating portions in the length direction which is located on the first outer electrode side may cover the first outer electrode, and another one of the outer end portions of the pair of first insulating coating portions in the length direction which is located on the second outer electrode side may cover the second outer electrode. Further, when viewed in the width direction, one of the outer end portions of the pair of second insulating coating portions in the length direction which is located on the first outer electrode side may cover the first outer electrode, and another one of the outer end portions of the pair of second insulating coating portions in the length direction which is located on the second outer electrode side may cover the second outer electrode.

In the electronic component according to the first preferred embodiment, when viewed in the width direction, one of the outer end portions of the pair of first insulating coating portions in the length direction which is located on the first outer electrode side may be covered with the first outer electrode, and another one of the outer end portions of the pair of first insulating coating portions in the length direction which is located on the second outer electrode side may be covered with the second outer electrode. Further, when viewed in the width direction, one of the outer end portions of the pair of second insulating coating portions in the length direction which is located on the first outer electrode side may be covered with the first outer electrode, and another one of the outer end portions of the pair of second insulating coating portions in the length direction which is located on the second outer electrode side may be covered with the second outer electrode.

In the electronic component according to the first preferred embodiment, the pair of first insulating coating portions may be in the state in which the inner end portions of the pair of first insulating coating portions in the length direction are held in contact with the third outer electrode and the state in which the outer end portions of the pair of first insulating coating portions in the length direction are held in contact with the first outer electrode and the second outer electrode. Further, the pair of second insulating coating portions may be in the state in which the inner end portions of the pair of second insulating coating portions in the length direction are held in contact with the fourth outer electrode and the state in which the outer end portions of the pair of second insulating coating portions in the length direction are held in contact with the first outer electrode and the second outer electrode.

In the electronic component according to the first preferred embodiment, the second inner electrode layer may include a first opposed electrode portion that faces the first inner electrode layer, a first extended electrode portion that extends from the first opposed electrode portion to the first lateral surface so as to reach the third outer electrode, and a second extended electrode portion that extends from the first opposed electrode portion to the second lateral surface so as to reach the fourth outer electrode. In this case, it is preferred that an end portion of the first extended electrode portion located on the first lateral surface side be located within a region where the pair of first insulating coating portions and the third outer electrode are provided, and that an end portion of the second extended electrode portion located on the second lateral surface side be located within a region where the pair of second insulating coating portions and the fourth outer electrode are provided.

In the electronic component according to the first preferred embodiment, when viewed in the width direction, the inner end portions of the pair of first insulating coating portions in the length direction may cover the third outer electrode. Further, when viewed in the width direction, one of the outer end portions of the pair of first insulating coating portions in the length direction which is located on the first outer electrode side may cover the first outer electrode, and another one of the outer end portions of the pair of first insulating coating portions in the length direction which is located on the second outer electrode side may cover the second outer electrode. Still further, when viewed in the width direction, the inner end portions of the pair of second insulating coating portions in the length direction may cover the fourth outer electrode. Still further, when viewed in the width direction, one of the outer end portions of the pair of second insulating coating portions in the length direction which is located on the first outer electrode side may cover the first outer electrode, and another one of the outer end portions of the pair of second insulating coating portions in the length direction which is located on the second outer electrode side may cover the second outer electrode.

In the electronic component according to the first preferred embodiment, when viewed in the width direction, the inner end portions of the pair of first insulating coating portions in the length direction may be covered with the third outer electrode. Further, when viewed in the width direction, one of the outer end portions of the pair of first insulating coating portions in the length direction which is located on the first outer electrode side may be covered with the first outer electrode, and another one of the outer end portions of the pair of first insulating coating portions in the length direction which is located on the second outer electrode side may be covered with the second outer electrode. Still further, when viewed in the width direction, the inner end portions of the pair of second insulating coating portions in the length direction may be covered with the fourth outer electrode. Still further, when viewed in the width direction, one of the outer end portions of the pair of second insulating coating portions in the length direction which is located on the first outer electrode side may be covered with the first outer electrode, and another one of the outer end portions of the pair of second insulating coating portions in the length direction which is located on the second outer electrode side may be covered with the second outer electrode.

In the electronic component according to the first preferred embodiment, it is preferred that maximum thicknesses of the pair of first insulating coating portions and the pair of second insulating coating portions be larger than each of a maximum thickness of the first outer electrode, a maximum thickness of the second outer electrode, a maximum thickness of the third outer electrode, and a maximum thickness of the fourth outer electrode.

In the electronic component according to the first preferred embodiment, it is preferred that each of the pair of first insulating coating portions and the pair of second insulating coating portions be made of a material containing a dielectric ceramic, a resin, or a glass.

In the electronic component according to the first preferred embodiment, each of the pair of first insulating coating portions and the pair of second insulating coating portions may be made of a material containing the dielectric ceramic. In this case, it is preferred that the dielectric ceramic include $BaTiO_3$, $CaTiO_3$, $SrTiO_3$, or $CaZrO_3$.

In the electronic component according to the first preferred embodiment, each of the pair of first insulating coating portions and the pair of second insulating coating portions may be made of a material containing the resin. In this case, it is preferred that the resin include an epoxy based resin or a polyimide based resin.

In the electronic component according to the first preferred embodiment, each of the pair of first insulating coating portions and the pair of second insulating coating portions may be made of a material containing the glass. In this case, it is preferred that the glass include Ba or Sr.

An electronic component according to a second preferred embodiment of the present invention includes a multilayer body including a first end surface and a second end surface located opposite each other in a length direction, a first lateral surface and a second lateral surface located opposite each other in a width direction perpendicular or substantially perpendicular to the length direction, and a first principal surface and a second principal surface located opposite each other in a thickness direction perpendicular or substantially perpendicular to the length direction and the width direction, a first outer electrode that reaches the first principal surface and the second principal surface from the first end surface, a second outer electrode that reaches the first principal surface and the second principal surface from the second end surface, a third outer electrode that reaches the first principal surface and the second principal surface from the first lateral surface, a fourth outer electrode that reaches the first principal surface and the second principal surface from the second lateral surface, a first insulating coating portion that is provided at a first ridge portion between the first end surface and the first lateral surface, a second insulating coating portion that is provided at a second ridge portion between the second end surface and the first lateral surface, a third insulating coating portion that is provided at a third ridge portion between the first end surface and the second lateral surface, and a fourth insulating coating portion that is provided at a fourth ridge portion between the second end surface and the second lateral surface. The multilayer body includes a plurality of dielectric layers and a plurality of inner electrode layers alternately laminated in a laminating direction that is the thickness direction. The plurality of inner electrode layers include a plurality of first inner electrode layers connected to the first outer electrode and the second outer electrode, and a plurality of second inner electrode layers connected to the third outer electrode and the fourth outer electrode. The first insulating coating portion extends to the first end surface, the first lateral surface, the first principal surface, and the second principal surface. The second insulating coating portion extends to the second end surface, the first lateral surface, the first principal surface, and the second principal surface. The third insulating coating portion extends to the first end surface, the second lateral surface, the first principal surface, and the second principal surface. The fourth insulating coating portion extends to the second end surface, the second lateral surface, the first principal surface, and the second principal surface. The first insulating coating portion and the second insulating coating portion are in at least one of a state in which end portions which are located on the third outer electrode side are held in contact with the third outer electrode and a state in which an end portion of the first insulating coating portion which is located on the first outer electrode side is held in contact with the first outer electrode and an end portion of the second insulating coating portion which is located on the second outer electrode side is held in contact with the second outer electrode. The third insulating coating portion and the fourth insulating coating portion are in at least one of a state in which end portions which are located on the fourth outer electrode side are held in contact with the fourth outer electrode and a state in which an end portion of the third insulating coating portion which is located on the first outer electrode side is held in contact with the first outer electrode and an end portion of the fourth insulating coating portion which is located on the second outer electrode side is held in contact with the second outer electrode.

In the electronic component according to the second preferred embodiment, it is preferred that the end portion of the first insulating coating portion which is located on the third outer electrode side be held in contact with the third outer electrode, and that the end portion of the first insulating coating portion which is located on the first outer electrode side be held in contact with the first outer electrode. Further, it is preferred that the end portion of the second insulating coating portion which is located on the third outer electrode side be held in contact with the third outer electrode, and that the end portion of the second insulating coating portion which is located on the second outer electrode side be held in contact with the second outer electrode. Still further, it is preferred that the end portion of the third insulating coating portion which is located on the fourth outer electrode side be held in contact with the fourth outer electrode, and that the end portion of the third insulating coating portion which is located on the first outer electrode side be held in contact with the first outer electrode. Still further, it is preferred that the end portion of the fourth insulating coating portion which is located on the fourth outer electrode side be held in contact with the fourth outer electrode, and that the end portion of the fourth insulating coating portion which is located on the second outer electrode side be held in contact with the second outer electrode.

In the electronic component according to the second preferred embodiment, it is preferred that the second inner electrode layer include a first opposed electrode portion that faces the first inner electrode layer, a first extended electrode portion that extends from the first opposed electrode portion to the first lateral surface so as to reach the third outer electrode, and a second extended electrode portion that extends from the first opposed electrode portion to the second lateral surface so as to reach the fourth outer electrode. Further, an end portion of the first extended electrode portion located on the first lateral surface side may extend in the length direction out of a region where the third outer electrode is provided. In this case, it is preferred that the end portion be located within a region where the first insulating coating portion, the second insulating coating portion, and the third outer electrode are provided. Still further, an end portion of the second extended electrode portion located on the second lateral surface side may extend in the length direction out of a region where the fourth outer electrode is provided. In this case, it is preferred that the end portion be located within a region where the third insulating coating portion, the fourth insulating coating portion, and the fourth outer electrode are provided.

In the electronic component according to the second preferred embodiment, it is preferred that the first inner electrode layer include a first end portion that is extended to the first end surface, and a second end portion that is extended to the second end surface. Further, the first end portion may extend in the width direction out of a region on the first end surface where the first outer electrode is provided. In this case, it is preferred that the first end portion be located within a region where the first insulating coating portion, the first outer electrode, and the third insulating coating portion are provided. Still further, the second end portion may extend in the width direction out of a region on the second end surface where the second outer electrode is provided. In this case, it is preferred that the second end portion be located within a region where the second insulating coating portion, the second outer electrode, and the fourth insulating coating portion are provided.

In the electronic component according to the second preferred embodiment, it is preferred that the end portions on the first end surface side of the first insulating coating portion and the third insulating coating portion be covered with the first outer electrode. Further, it is preferred that the end portions on the second end surface side of the second insulating coating portion and the fourth insulating coating portion be covered with the second outer electrode. Still further, it is preferred that the end portions on the first lateral surface side of the first insulating coating portion and the second insulating coating portion be covered with the third outer electrode. Still further, it is preferred that the end portions on the second lateral surface side of the third insulating coating portion and the fourth insulating coating portion be covered with the fourth outer electrode.

In the electronic component according to the second preferred embodiment, it is preferred that each of the first insulating coating portion, the second insulating coating portion, the third insulating coating portion, and the fourth insulating coating portion be made of a material containing a dielectric ceramic, a resin, or a glass.

In the electronic component according to the second preferred embodiment, each of the first insulating coating portion, the second insulating coating portion, the third insulating coating portion, and the fourth insulating coating portion may be made of a material containing the dielectric ceramic. In this case, it is preferred that the dielectric ceramic include $BaTiO_3$, $CaTiO_3$, $SrTiO_3$, or $CaZrO_3$.

In the electronic component according to the second preferred embodiment, each of the first insulating coating portion, the second insulating coating portion, the third insulating coating portion, and the fourth insulating coating portion may be made of a material containing the resin. In this case, it is preferred that the resin include an epoxy resin or a polyimide resin.

In the electronic component according to the second preferred embodiment, each of the first insulating coating portion, the second insulating coating portion, the third insulating coating portion, and the fourth insulating coating portion may be made of a material containing the glass. In this case, it is preferred that the glass include Ba or Sr.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
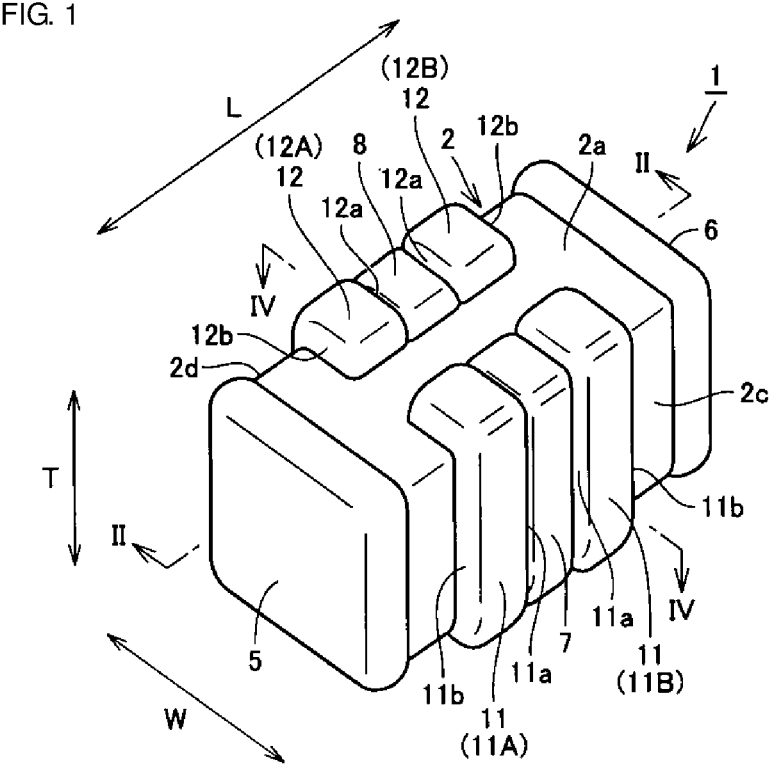
FIG. 1 is a perspective view of a multilayer ceramic capacitor according to a first preferred embodiment of the present invention.

Preferred embodiments of the present invention are described in detail below with reference to the drawings. Each of the preferred embodiments described below demonstrates a multilayer ceramic capacitor as an example of an electronic component. In the preferred embodiments described below, the same or common elements are denoted by the same reference symbols in the drawings and description thereof is not repeated.

First Preferred Embodiment

Figure 2:
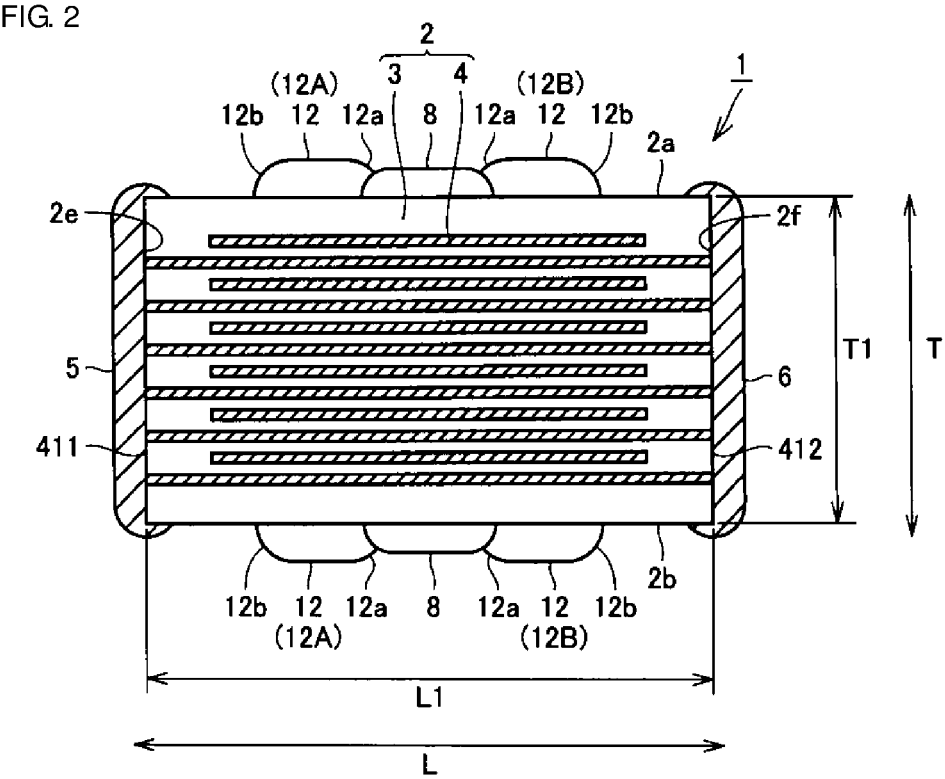
FIG. 2 is a vertical cross-sectional view taken along the line II-II illustrated in FIG. 1.
Figure 3:
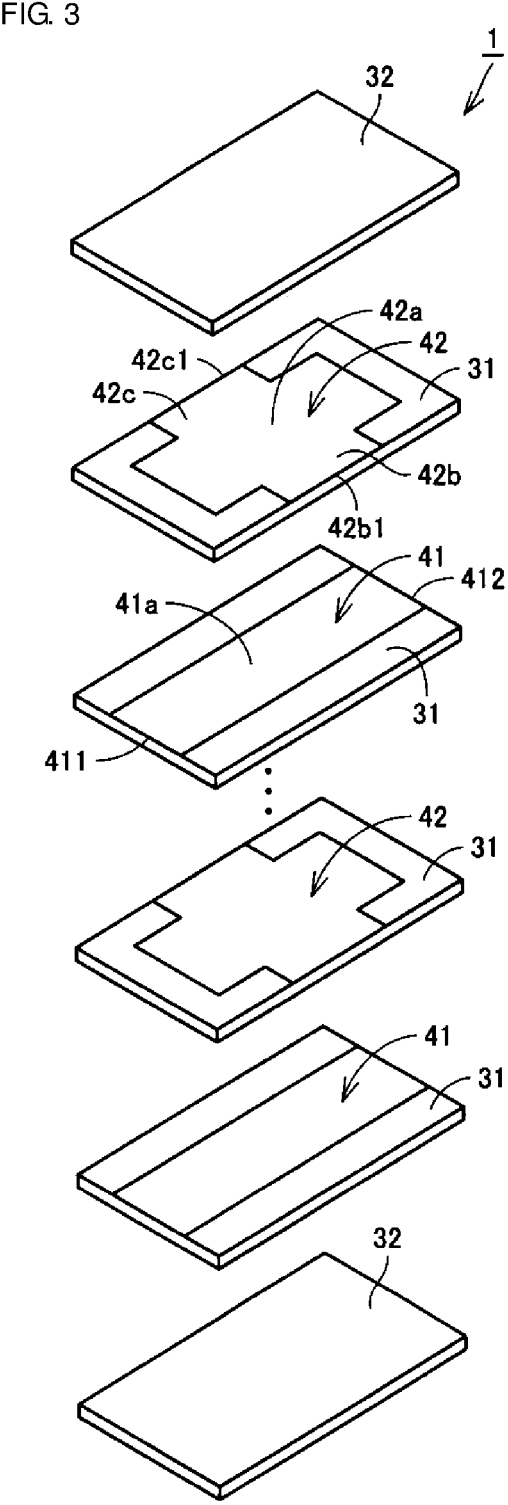
FIG. 3 is an exploded perspective view of a ceramic element assembly included in the multilayer ceramic capacitor according to the first preferred embodiment of the present invention.
Figure 4:
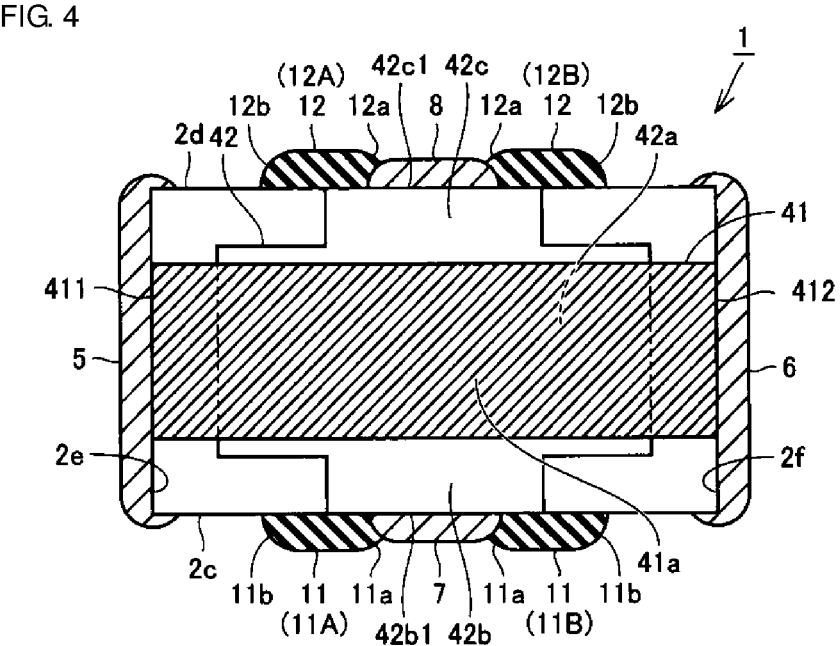
FIG. 4 is a horizontal cross-sectional view of the multilayer ceramic capacitor according to the first preferred embodiment of the present invention, which is taken along the line IV-IV illustrated in FIG. 1.

FIG. 1 is a perspective view of a multilayer ceramic capacitor according to a first preferred embodiment of the present invention. FIG. 2 is a vertical cross-sectional view taken along the line II-II illustrated in FIG. 1. FIG. 3 is an exploded perspective view of a ceramic element assembly included in the multilayer ceramic capacitor according to the first preferred embodiment. FIG. 4 is a horizontal cross-sectional view of the multilayer ceramic capacitor according to the first preferred embodiment, which is taken along the line IV-IV illustrated in FIG. 1. A multilayer ceramic capacitor 1 according to the first preferred embodiment is described with reference to FIG. 1 to FIG. 4.

As illustrated in FIG. 1 and FIG. 2, the multilayer ceramic capacitor 1 according to the first preferred embodiment preferably includes a ceramic element assembly 2 as a multilayer body, a first outer electrode 5, a second outer electrode 6, a third outer electrode 7, a fourth outer electrode 8, a pair of first insulating coating portions 11, and a pair of second insulating coating portions 12.

The ceramic element assembly 2 preferably has a rectangular parallel or substantially parallelepiped or substantially rectangular parallel or substantially parallelepiped outer shape. The ceramic element assembly 2 includes a first end surface 2e and a second end surface 2f located opposite each other in a length direction L, a first lateral surface 2c and a second lateral surface 2d located opposite each other in a width direction W perpendicular or substantially perpendicular to the length direction L, and a first principal surface 2a and a second principal surface 2b located opposite each other in a thickness direction T perpendicular or substantially perpendicular to the length direction L and the width direction W.

The ceramic element assembly 2 preferably has an elongated rectangular parallel or substantially parallelepiped or substantially elongated rectangular parallel or substantially parallelepiped shape in which a length dimension L1 along the length direction L is larger than a width dimension W1 along the width direction and a thickness dimension T1 along the thickness direction.

The rectangular parallel or substantially parallelepiped or substantially rectangular parallel or substantially parallelepiped shape preferably includes a rectangular or substantially rectangular solid that is rounded in at least one of the corner portion and the ridge portion. Further, the rectangular parallel or substantially parallelepiped or substantially rectangular parallel or substantially parallelepiped shape includes a rectangular or substantially rectangular solid having negligible irregularities or steps defined on any one of the first end surface 2e, the second end surface 2f, the first lateral surface 2c, the second lateral surface 2d, the first principal surface 2a, and the second principal surface 2b.

As illustrated in FIG. 2, the ceramic element assembly 2 preferably includes a plurality of dielectric layers 3 and a plurality of inner electrode layers 4 alternately laminated along a laminating direction that is the thickness direction T.

The dielectric layer 3 is preferably made of a ceramic material containing, for example, barium titanate as a main component. Further, the dielectric layer 3 may contain a Mn compound, a Mg compound, a Si compound, a Co compound, a Ni compound, a rare-earth compound, or the like as a subcomponent of ceramic powder that is a material of a ceramic sheet, described later. The inner electrode layer 4 is preferably made of a metal material such as, for example, Ni, Cu, Ag, Pd, a Ag—Pd alloy, and Au.

The material of the dielectric layer 3 is not limited to the above-mentioned ceramic material containing barium titanate as a main component, and another ceramic material (material containing, for example, $CaTiO_3$, $SrTiO_3$, or $CaZrO_3$ as a main component) may be selected as the material of the dielectric layer 3. Further, the material of the inner electrode layer 4 is not limited to the above-mentioned metal material, and another conductive material may be selected as the material of the inner electrode layer 4.

As illustrated in FIG. 3, the plurality of dielectric layers 3 preferably include a plurality of inner dielectric layers 31 and a plurality of outer dielectric layers 32. The plurality of inner electrode layers 4 preferably include a plurality of first inner electrode layers 41 and a plurality of second inner electrode layers 42.

The plurality of inner dielectric layers 31 are sandwiched by the plurality of outer dielectric layers 32. The first inner electrode layers 41 and the second inner electrode layers 42 are alternately located between the inner dielectric layers 31 adjacent to each other.

The second inner electrode layer 42 is provided on the surface of the inner dielectric layer 31. The second inner electrode layer 42 is connected to the third outer electrode 7 and the fourth outer electrode 8. The second inner electrode layer 42 includes a first opposed electrode portion 42a, a first extended electrode portion 42b, and a second extended electrode portion 42c.

The first opposed electrode portion 42a is a portion of the second inner electrode layer 42 which faces the first inner electrode layer 41. The first extended electrode portion 42b extends from the first opposed electrode portion 42a to the first lateral surface 2c so as to reach the third outer electrode 7. The first extended electrode portion 42b has an end portion 42b1 located on the first lateral surface 2c side. The second extended electrode portion 42c extends from the first opposed electrode portion 42a to the second lateral surface 2d so as to reach the fourth outer electrode 8. The second extended electrode portion 42c has an end portion 42c1 located on the second lateral surface 2d side.

The first inner electrode layer 41 is provided on the inner dielectric layer 31 different from the inner dielectric layer 31 where the second inner electrode layer 42 is provided. The first inner electrode layer 41 is provided on the surface of the inner dielectric layer 31. The first inner electrode layer 41 is connected to the first outer electrode 5 and the second outer electrode 6. The first inner electrode layer 41 includes a second opposed electrode portion 41a. The second opposed electrode portion 41a faces the first opposed electrode portion 42a of the second inner electrode layer 42. The first inner electrode layer includes a first end portion 411 extended to the first end surface 2e, and a second end portion 412 extended to the second end surface 2f.

Referring back to FIG. 1 and FIG. 2, the first outer electrode 5 reaches the first principal surface 2a, the second principal surface 2b, the first lateral surface 2c, and the second lateral surface 2d from the first end surface 2e.

The second outer electrode 6 reaches the first principal surface 2a, the second principal surface 2b, the first lateral surface 2c, and the second lateral surface 2d from the second end surface 2f.

The third outer electrode 7 is provided on the first lateral surface 2c so as to be located between the first end surface 2e and the second end surface 2f in the length direction L.

The third outer electrode 7 reaches the first principal surface 2a and the second principal surface 2b from the first lateral surface 2c.

The fourth outer electrode 8 is provided on the second lateral surface 2d so as to be located between the first end surface 2e and the second end surface 2f in the length direction L. The fourth outer electrode 8 reaches the first principal surface 2a and the second principal surface 2b from the second lateral surface 2d.

Each of the first outer electrode 5, the second outer electrode 6, the third outer electrode 7, and the fourth outer electrode 8 preferably include an underlying electrode layer and a plating layer on the underlying electrode layer. The underlying electrode layer includes at least one of a baked layer and a thin film layer. The thickness of the underlying electrode layer is preferably about 10 µm or more and about 100 µm or less, for example.

The baked layer preferably contains a glass and a metal. The material of the baked layer is composed of one kind of metal selected from the group consisting of Ni, Cu, Ag, Pd, and Au, or an alloy containing this metal. For example, an alloy of Ag and Pd may be used. The baked layer may be defined by a plurality of laminated layers. The baked layer may be a layer made of conductive paste applied to and baked on the ceramic element assembly 2, or a layer fired simultaneously with the inner electrode layer 4.

A resin layer contains conductive particles and a thermosetting resin. When the resin layer is provided, the resin layer may directly be provided on the ceramic element assembly 2 without providing the baked layer. The resin layer may be defined by a plurality of laminated layers. The thickness of the resin layer is preferably about 10 µm or more and about 150 µm or less, for example.

The thin film layer is preferably formed by a thin film forming method such as sputtering or vapor deposition. The thin film layer is a layer of about 1 µm or less, for example, in which metal particles are deposited.

The material used in forming the plating layer is preferably composed of one kind of metal selected from the group consisting of Ni, Cu, Ag, Pd, and Au, or an alloy containing this metal. For example, an alloy of Ag and Pd may be used.

The plating layer may be defined by a plurality of laminated layers. In this case, it is preferred that the plating layer have a double-layer structure in which a tin plating layer is formed on a nickel plating layer. The nickel plating layer preferably prevents the underlying electrode layer from being eroded by solder when the ceramic electronic component is mounted. The tin plating layer has a function of facilitating the mounting of the ceramic electronic component by improving wettability when the ceramic electronic component is mounted. The thickness of a single plating layer is preferably about 1.0 µm or more and about 10.0 µm or less, for example.

The pair of first insulating coating portions 11 is provided so that the third outer electrode 7 is located therebetween in the length direction L. The pair of first insulating coating portions 11 reaches the first principal surface 2a and the second principal surface 2b from the first lateral surface 2c.

The pair of second insulating coating portions 12 is located opposite the pair of first insulating coating portions 11 in the width direction. The pair of second insulating coating portions 12 is provided at a position corresponding to the pair of first insulating coating portions 11.

The pair of second insulating coating portions 12 is provided so that the fourth outer electrode 8 is located therebetween in the length direction L. The pair of second insulating coating portions 12 reaches the first principal surface 2a and the second principal surface 2b from the second lateral surface 2d.

The pair of first insulating coating portions 11 and the pair of second insulating coating portions 12 are preferably about 10 µm or more and about 150 µm or less, for example. As the material of the pair of first insulating coating portions 11 and the pair of second insulating coating portions 12, a dielectric ceramic, a resin, or a glass may be used. When a dielectric ceramic is used as the material of the pair of first insulating coating portions 11 and the pair of second insulating coating portions 12, $BaTiO_3$, $CaTiO_3$, $SrTiO_3$, $CaZrO_3$, or the like may be used as a main component. Further, a Mn compound, a Mg compound, a Si compound, an Fe compound, a Cr compound, a Co compound, a Ni compound, an Al compound, a V compound, a rare-earth compound, or the like may be added to the main component as a subcomponent.

The pair of first insulating coating portions 11 and the pair of second insulating coating portions 12 may be provided by applying and firing ceramic dielectric slurry to and on the ceramic element assembly 2, or may be provided by being fired simultaneously with a multilayer chip described later.

When a resin is used as the material of the pair of first insulating coating portions 11 and the pair of second insulating coating portions 12, a resin containing an epoxy resin or a polyimide resin is preferably used. In this case, the pair of first insulating coating portions 11 and the pair of second insulating coating portions 12 are provided by applying and thermally curing resin paste to and on the ceramic element assembly 2.

When a glass is used as the material of the pair of first insulating coating portions 11 and the pair of second insulating coating portions 12, a glass containing Ba or Sr is used. In this case, the pair of first insulating coating portions 11 and the pair of second insulating coating portions 12 are provided by applying and baking glass paste to and on the ceramic element assembly 2.

As illustrated in FIG. 1 and FIG. 4, one first insulating coating portion 11A out of the pair of first insulating coating portions 11 is located on the first outer electrode 5 side in the length direction L. Another first insulating coating portion 11B out of the pair of first insulating coating portions 11 is located on the second outer electrode 6 side in the length direction.

The pair of first insulating coating portions 11 is in a state in which inner end portions 11a of the pair of first insulating coating portions 11 are held in contact with the third outer electrode 7. Specifically, the end portion 11a on the second outer electrode 6 side of the one first insulating coating portion 11A is held in contact with the third outer electrode 7, and the end portion 11a on the first outer electrode 5 side of the other first insulating coating portion 11B is held in contact with the third outer electrode 7.

More specifically, the inner end portions 11a of the pair of first insulating coating portions 11 in the length direction L cover the third outer electrode 7.

Further, the maximum thickness of the pair of first insulating coating portions 11 on the first lateral surface 2c is preferably larger than the maximum thickness of the third outer electrode 7 on the first lateral surface 2c.

Each of the maximum thickness of the pair of first insulating coating portions 11 and the maximum thickness of the third outer electrode 7 on the first lateral surface 2c is measured as follows. First, the multilayer ceramic electronic component is ground up to the central position in the thickness direction T to expose a cross section perpendicular or substantially perpendicular to the thickness direction T. Measurement is conducted by observing the exposed cross section with a microscope.

The pair of first insulating coating portions 11 is in a state in which outer end portions 11b of the pair of first insulating coating portions 11 are kept out of contact with the first outer electrode 5 and the second outer electrode 6. Specifically, the end portion 11b on the first outer electrode 5 side of the one first insulating coating portion 11A is located away from the first outer electrode 5, and the end portion 11b on the second outer electrode 6 side of the other first insulating coating portion 11B is located away from the second outer electrode 6.

One second insulating coating portion 12A out of the pair of second insulating coating portions 12 is located on the first outer electrode 5 side in the length direction L. Another second insulating coating portion 12B out of the pair of second insulating coating portions 12 is located on the second outer electrode 6 side in the length direction.

Inner end portions 12a of the pair of second insulating coating portions 12 are held in contact with the fourth outer electrode 8. Specifically, the end portion 12a on the second outer electrode 6 side of the one second insulating coating portion 12A is held in contact with the fourth outer electrode 8, and the end portion 12a on the first outer electrode 5 side of the other second insulating coating portion 12B is held in contact with the fourth outer electrode 8.

The inner end portions 12a of the pair of second insulating coating portions 12 in the length direction L cover the fourth outer electrode 8.

Further, the maximum thickness of the pair of second insulating coating portions 12 on the second lateral surface 2d is larger than the maximum thickness of the fourth outer electrode 8 on the second lateral surface 2d.

The pair of second insulating coating portions 12 is in a state in which outer end portions 12b of the pair of second insulating coating portions 12 are kept out of contact with the first outer electrode 5 and the second outer electrode 6. Specifically, the end portion 12b on the first outer electrode 5 side of the one second insulating coating portion 12A is preferably located away from the first outer electrode 5, and the end portion 12b on the second outer electrode 6 side of the other second insulating coating portion 12B is located away from the second outer electrode 6.

The end portion 42b1 of the first extended electrode portion 42b located on the first lateral surface 2c side extends in the length direction L out of a region where the third outer electrode 7 is provided, and is located within a region where the pair of first insulating coating portions 11 and the third outer electrode 7 are provided.

Figure 5:
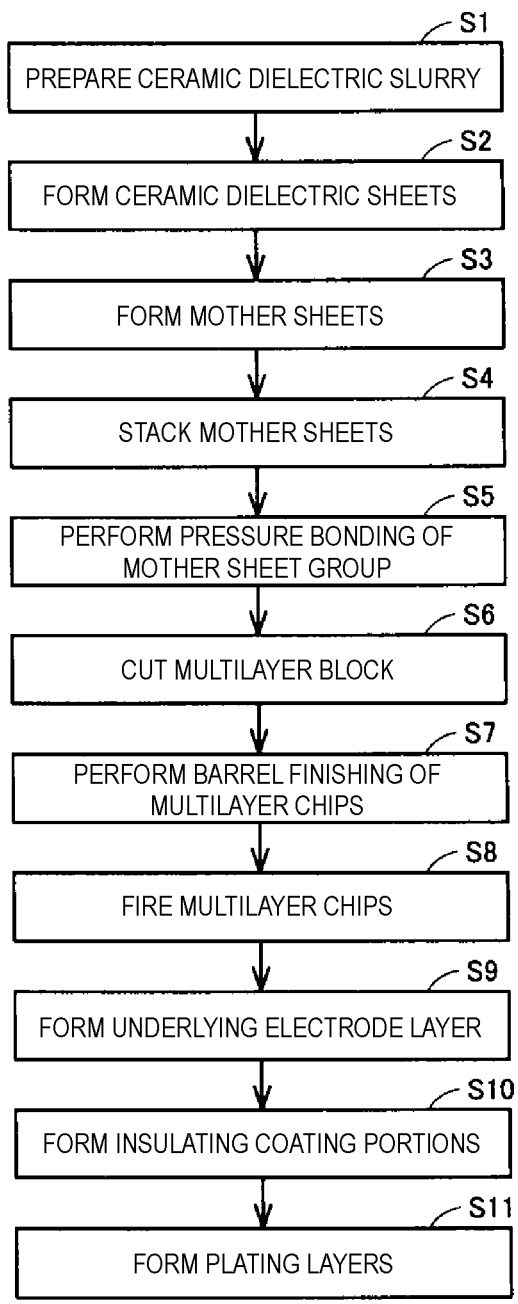
FIG. 5 is a flowchart illustrating a preferred embodiment of a method of manufacturing the multilayer ceramic capacitor according to the first preferred embodiment of the present invention.

The end portion 42c1 of the second extended electrode portion 42c located on the second lateral surface 2d side extends in the length direction L out of a region where the fourth outer electrode 8 is provided, and is located within a region where the pair of second insulating coating portions 12 and the fourth outer electrode 8 are provided. FIG. 5 is a flowchart illustrating a preferred embodiment of a method of manufacturing the multilayer ceramic capacitor according to the first preferred embodiment. A method of manufacturing the multilayer ceramic capacitor 1 according to the first preferred embodiment is described with reference to FIG. 5.

As illustrated in FIG. 5, when manufacturing the multilayer ceramic capacitor 1 according to the first preferred embodiment, ceramic dielectric slurry is first prepared (Step S1). Specifically, ceramic dielectric powder, additive powder, a binder resin, dissolving liquid, and the like are dispersed and mixed, thus preparing ceramic dielectric slurry. The ceramic dielectric slurry may be any one of solvent-based ceramic dielectric slurry and water-based ceramic dielectric slurry. When ceramic dielectric slurry is prepared as a water-based coating material, water-soluble binder, dispersant, and the like are mixed with a dielectric material dissolved in water, thus preparing ceramic dielectric slurry.

Next, ceramic dielectric sheets are formed (Step S2). Specifically, the ceramic dielectric slurry is formed into a substantially flat sheet shape on a carrier film by using a die coater, a gravure coater, a micro-gravure coater, or the like, and the formed ceramic dielectric slurry is dried, thus forming a ceramic dielectric sheet. The thickness of the ceramic dielectric sheet is preferably about 3 μm or less, for example, from the viewpoint of achieving a smaller size and a higher capacitance of the multilayer ceramic capacitor 1.

Next, mother sheets are formed (Step S3). Specifically, conductive paste is preferably applied to the ceramic dielectric sheet so as to have a predetermined pattern, thus forming a mother sheet having a predetermined inner electrode pattern on the ceramic dielectric sheet. As a method of applying the conductive paste, screen printing, ink jet printing, gravure printing, or the like may be used. The thickness of the inner electrode pattern is preferably about 1.5 μm or less, for example, from the viewpoint of achieving a smaller size and a higher capacitance of the multilayer ceramic capacitor 1. As the mother sheets, ceramic dielectric sheets that are not subjected to Step S3 are prepared in addition to the mother sheets having inner electrode patterns.

Next, a plurality of mother sheets are stacked (Step S4). Specifically, a predetermined number of mother sheets composed only of the ceramic dielectric sheets having no inner electrode patterns are stacked. On those mother sheets, a predetermined number of mother sheets having inner electrode patterns are stacked. On those mother sheets, a predetermined number of mother sheets composed only of the ceramic dielectric sheets having no inner electrode patterns are further stacked. In this manner, a mother sheet group is formed.

Next, a multilayer block is formed by pressure bonding of the mother sheet group (Step S5). Specifically, the mother sheet group is subjected to pressure bonding preferably by being pressurized in the laminating direction by isostatic press or rigid press, thus forming a multilayer block.

Next, multilayer chips are formed by cutting the multilayer block (Step S6). Specifically, the multilayer block is cut into a matrix by force cutting, cutting with a dicing machine, or laser cutting, thus dividing the multilayer block into a plurality of individual multilayer chips.

Next, the multilayer chips are subjected to barrel finishing (Step S7). Specifically, the multilayer chips are sealed in a small box called a barrel together with media balls having higher hardness than the dielectric material, and the barrel is rotated to polish the multilayer chips. In this manner, the corner portions and the ridge portions of the multilayer chips are rounded.

Next, the multilayer chips are fired (Step S8). Specifically, the multilayer chips are heated and therefore the dielectric material and the conductive material contained in the multilayer chips are fired, thus forming the ceramic element assembly 2. The firing temperature is set as appropriate depending on the dielectric material and the conductive material, and is preferably about 900° C. or more and about 1300° C. or less, for example.

Next, conductive paste is applied to the surface of the ceramic element assembly 2. In this preferred embodiment, the conductive paste is preferably applied to the surface of the ceramic element assembly 2 by roller transfer. However, the method of applying the conductive paste is not limited to the roller transfer and may be spray coating, dip coating, or the like.

Figure 6:
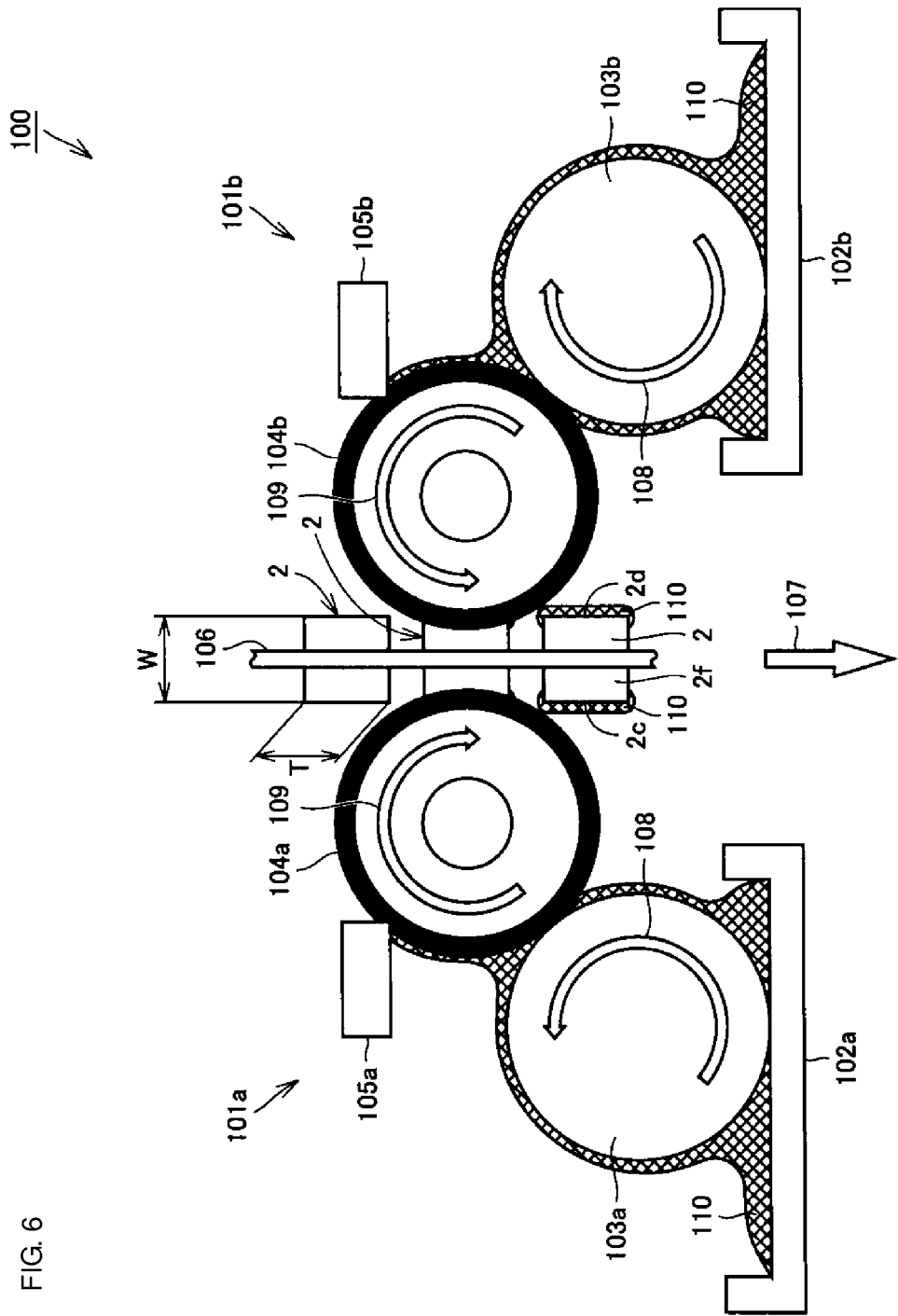
FIG. 6 is a view illustrating the configuration of an applicator configured to apply conductive paste to the ceramic element assembly of the multilayer ceramic capacitor according to the first preferred embodiment of the present invention.
Figure 7:
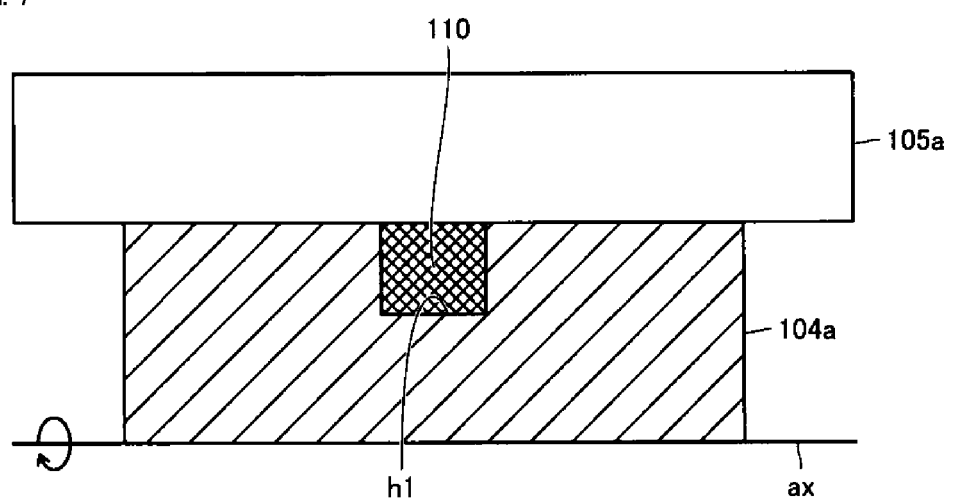
FIG. 7 is a cross-sectional view illustrating a state in which a first transfer roller and a first scraper of the applicator illustrated in FIG. 6 are held in contact with each other.

FIG. 6 is a view illustrating the configuration of an applicator configured to apply the conductive paste to the ceramic element assembly of the multilayer ceramic capacitor according to the first preferred embodiment. FIG. 7 is a cross-sectional view illustrating a state in which a first transfer roller and a first scraper of the applicator illustrated in FIG. 6 are held in contact with each other.

As illustrated in FIGS. 6 and 7, an applicator 100 preferably includes a first application mechanism 101a and a second application mechanism 101b located away from each other. The first application mechanism 101a includes a first container 102a that stores conductive paste 110, a first supply roller 103a partially located inside the first container 102a, a first transfer roller 104a brought into rolling contact with the outer peripheral surface of the first supply roller 103a, and a first scraper 105a brought into sliding contact with the outer peripheral surface of the first transfer roller 104a.

Similarly, the second application mechanism 101b includes a second container 102b that stores the conductive paste 110, a second supply roller 103b partially located inside the second container 102b, a second transfer roller 104b brought into rolling contact with the outer peripheral surface of the second supply roller 103b, and a second scraper 105b brought into sliding contact with the outer peripheral surface of the second transfer roller 104b.

Each of the first transfer roller 104a and the second transfer roller 104b preferably includes a substantially columnar body portion and an elastic portion that covers the outer periphery of the body portion. The body portion is preferably made of iron, but the material of the body portion is not limited to iron and may be another metal or a composite material such as carbon fiber reinforced plastics (CFRP). The elastic portion is preferably made of silicone rubber, but the material of the elastic portion is not limited to silicone rubber and may be other rubber having appropriate deformation resistance.

Each of the first transfer roller 104a and the second transfer roller 104b is rotated about a rotation axis ax. A first groove portion h1 that is continuous in an annular or substantially annular shape is provided on the outer peripheral surface of each of the first transfer roller 104a and the second transfer roller 104b. The first groove portion h1 is provided at the center in the direction of the rotation axis ax on the outer peripheral surface of each of the first transfer roller 104a and the second transfer roller 104b.

An operation to be performed by the applicator 100 when applying the conductive paste 110 to the ceramic element assembly 2 of the multilayer ceramic capacitor 1 is described below. First, the first supply roller 103a and the second supply roller 103b are rotated in opposite directions as indicated by arrows 108. Thus, the conductive paste 110 in the first container 102a adheres to the outer peripheral surface of the first supply roller 103a, and the conductive paste 110 in the second container 102b adheres to the outer peripheral surface of the second supply roller 103b.

The first transfer roller 104a and the second transfer roller 104b are rotated in opposite directions as indicated by arrows 109. The first transfer roller 104a is brought into rolling contact with the first supply roller 103a. Thus, the conductive paste 110 adhering to the outer peripheral surface of the first supply roller 103a is shifted to the outer surface of the first transfer roller 104a.

The second transfer roller 104b is brought into rolling contact with the second supply roller 103b. Thus, the conductive paste 110 adhering to the outer peripheral surface of the second supply roller 103b is shifted to the outer surface of the second transfer roller 104b.

As illustrated in FIG. 7, the conductive paste 110 shifted to the outer surface of the first transfer roller 104a is filled into the first groove portion h1 and a surplus is scraped off by the first scraper 105a brought into sliding contact with the outer peripheral surface of the first transfer roller 104a.

Similarly, the conductive paste 110 shifted to the outer surface of the second transfer roller 104b is filled into the first groove portion h1 and a surplus is scraped off by the second scraper 105b brought into sliding contact with the outer peripheral surface of the second transfer roller 104b.

Next, a plurality of ceramic element assemblies 2 are sequentially moved through a space between the first transfer roller 104a and the second transfer roller 104b in a transport direction indicated by an arrow 107 while being nipped by the first transfer roller 104a and the second transfer roller 104b. The plurality of ceramic element assemblies 2 are supported by attaching carrier tapes 106 to the first end surface 2e and the second end surface 2f, respectively.

The length direction L of the ceramic element assembly and the direction of the rotation axis ax are parallel or substantially parallel to each other, and the thickness direction T of the ceramic element assembly 2 and the transport direction of the ceramic element assembly 2 are parallel or substantially parallel to each other. The transport speed of the ceramic element assembly 2 and the rotation speed of the outer periphery of each of the first transfer roller 104a and the second transfer roller 104b are equal or substantially equal to each other.

Figure 8:
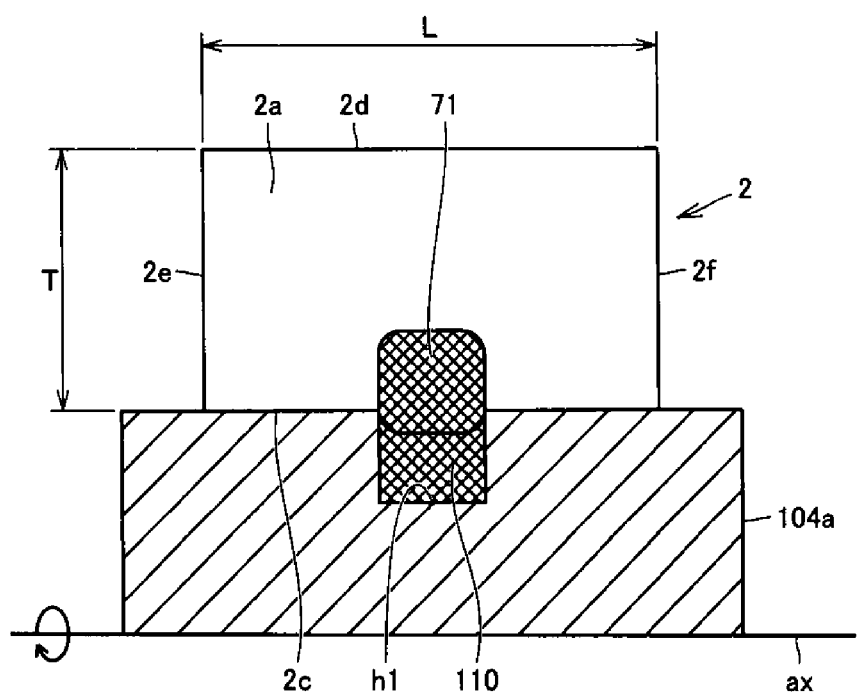
FIG. 8 is a cross-sectional view illustrating a state in which the first transfer roller of the applicator illustrated in FIG. 6 and the ceramic element assembly are held in contact with each other.

FIG. 8 is a cross-sectional view illustrating a state in which the first transfer roller of the applicator illustrated in FIG. 6 and the ceramic element assembly are held in contact with each other.

As illustrated in FIGS. 6 and 8, a portion of the conductive paste 110 filled in the first groove portion h1 of the first transfer roller 104a is transferred over a region from the first lateral surface 2c of the ceramic element assembly 2 to a portion of each of the first principal surface 2a and the second principal surface 2b thereof, thus forming a third outer electrode pattern 71.

Similarly, a portion of the conductive paste 110 filled in the first groove portion h1 of the second transfer roller 104b is transferred over a region from the second lateral surface 2d of the ceramic element assembly 2 to a portion of each of the first principal surface 2a and the second principal surface 2b thereof, thus forming a fourth outer electrode pattern.

Next, a first outer electrode pattern and a second outer electrode pattern are preferably formed by using, for example, dip coating. Specifically, the ceramic element assembly 2 on which the third outer electrode pattern 71 and the fourth outer electrode pattern have been formed is held and the first end surface 2e is dipped into conductive paste retained by a conductive paste retainer (not illustrated). At this time, the conductive paste is applied so as to reach the first principal surface 2a, the second principal surface 2b, the first lateral surface 2c, and the second lateral surface 2d from the first end surface 2e, thus forming a first outer electrode pattern.

Next, the ceramic element assembly 2 on which the third outer electrode pattern 71, the fourth outer electrode pattern, and the first outer electrode pattern have been formed is held and the second end surface 2f is dipped into the conductive paste retained by the conductive paste retainer (not illustrated). At this time, the conductive paste is applied so as to reach the first principal surface 2a, the second principal surface 2b, the first lateral surface 2c, and the second lateral surface 2d from the second end surface 2f, thus forming a second outer electrode pattern.

Next, the first outer electrode pattern, the second outer electrode pattern, the third outer electrode pattern, and the fourth outer electrode pattern that have been formed on the ceramic element assembly 2 are baked. Thus, a baked layer serving as an underlying electrode layer is formed (Step S9). The baking temperature is preferably, for example, about 840° C.

Next, ceramic dielectric slurry is applied to the surface of the ceramic element assembly 2. In the first preferred embodiment, the ceramic dielectric slurry is applied to the surface of the ceramic element assembly 2 by roller transfer. The method of applying the ceramic dielectric slurry is not limited to the roller transfer and may be spray coating, dip coating, or the like.

Figure 9:
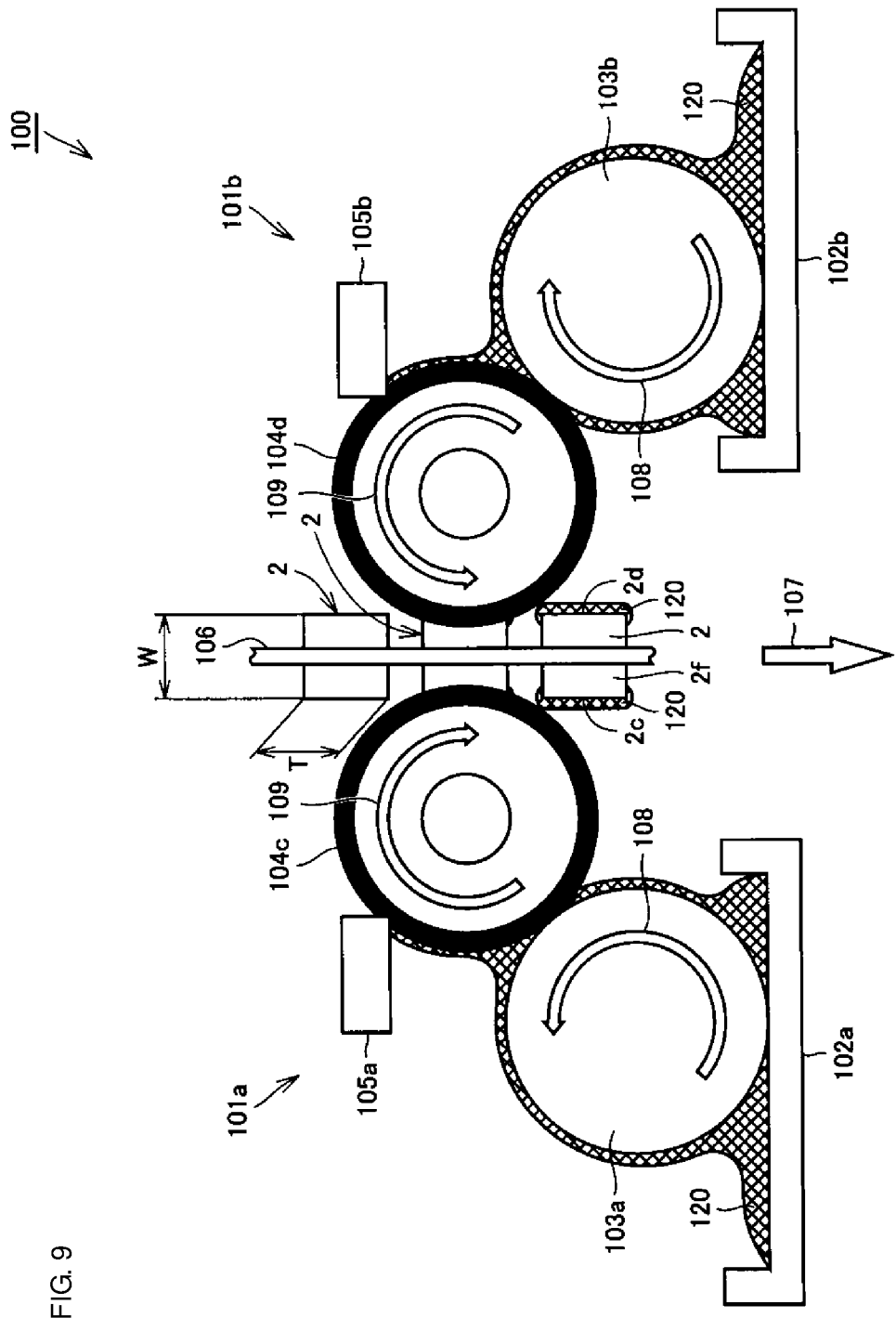
FIG. 9 is a view illustrating the configuration of an applicator configured to apply ceramic dielectric slurry to the ceramic element assembly of the multilayer ceramic capacitor according to the first preferred embodiment of the present invention.
Figure 10:
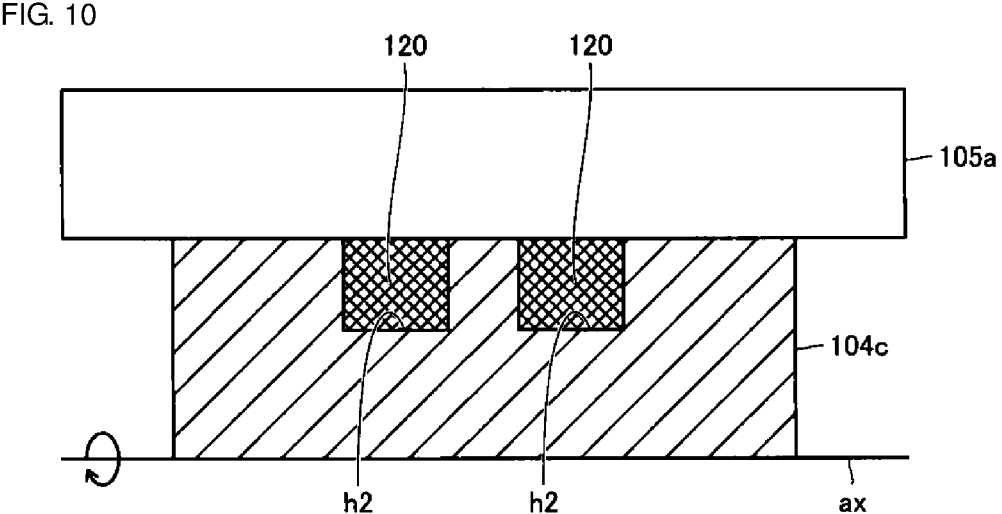
FIG. 10 is a cross-sectional view illustrating a state in which a first transfer roller and a first scraper of the applicator illustrated in FIG. 9 are held in contact with each other.

FIG. 9 is a view illustrating the configuration of an applicator configured to apply the ceramic dielectric slurry to the ceramic element assembly of the multilayer ceramic capacitor according to the first preferred embodiment. FIG. 10 is a cross-sectional view illustrating a state in which a first transfer roller and a first scraper of the applicator illustrated in FIG. 9 are held in contact with each other.

As illustrated in FIGS. 9 and 10, an applicator 100 preferably includes a first application mechanism 101a and a second application mechanism 101b located away from each other. The first application mechanism 101a includes a first container 102a that stores ceramic dielectric slurry 120, a first supply roller 103a partially located inside the first container 102a, a first transfer roller 104c brought into rolling contact with the outer peripheral surface of the first supply roller 103a, and a first scraper 105a brought into sliding contact with the outer peripheral surface of the first transfer roller 104c.

Similarly, the second application mechanism 101b includes a second container 102b that stores the ceramic dielectric slurry 120, a second supply roller 103b partially located inside the second container 102b, a second transfer roller 104d brought into rolling contact with the outer peripheral surface of the second supply roller 103b, and a second scraper 105b brought into sliding contact with the outer peripheral surface of the second transfer roller 104d.

Each of the first transfer roller 104c and the second transfer roller 104d includes a columnar or substantially columnar body portion and an elastic portion that covers the outer periphery of the body portion. The body portion is preferably made of iron, but the material of the body portion is not limited to iron and may be another metal or a composite material such as carbon fiber reinforced plastics (CFRP). The elastic portion is preferably made of silicone rubber, but the material of the elastic portion is not limited to silicone rubber and may be other rubber having appropriate deformation resistance.

Each of the first transfer roller 104c and the second transfer roller 104d is rotated about a rotation axis ax. A pair of second groove portions h2 that is continuous in an annular or substantially annular shape is provided on the outer peripheral surface of each of the first transfer roller 104c and the second transfer roller 104d. The pair of second groove portions h2 are provided away from each other in the direction of the rotation axis ax on the outer surface of each of the first transfer roller 104c and the second transfer roller 104d.

The pair of second groove portions h2 of each of the first transfer roller 104c and the second transfer roller 104d are provided on or substantially on both sides of the position corresponding to the first groove portion h1 of each of the first transfer roller 104a and the second transfer roller 104b.

In the first preferred embodiment, the width of each of the pair of second groove portions h2 is preferably larger than the width of the first groove portion h1. In the first preferred embodiment, the cross-sectional shape of the inner region of each of the pair of second groove portions h2 is preferably a rectangular or substantially rectangular shape, but is not limited to the rectangular or substantially rectangular shape and may be a semicircular of substantially semicircular shape, a semielliptical or substantially semielliptical shape, or the like.

An operation to be performed by the applicator 100 when applying the ceramic dielectric slurry 120 to the ceramic element assembly 2 of the multilayer ceramic capacitor 1 is described below. First, the first supply roller 103a and the second supply roller 103b are rotated in opposite directions as indicated by arrows 108. Thus, the ceramic dielectric slurry 120 in the first container 102a adheres to the outer peripheral surface of the first supply roller 103a.

The first transfer roller 104c and the second transfer roller 104d are rotated in opposite directions as indicated by arrows 109. The first transfer roller 104c is brought into rolling contact with the first supply roller 103a. Thus, the ceramic dielectric slurry 120 adhering to the outer peripheral surface of the first supply roller 103a is shifted to the outer surface of the first transfer roller 104c.

The second transfer roller 104d is brought into rolling contact with the second supply roller 103b. Thus, the ceramic dielectric slurry 120 adhering to the outer peripheral surface of the second supply roller 103b is shifted to the outer surface of the second transfer roller 104d.

As illustrated in FIG. 10, the ceramic dielectric slurry 120 shifted to the outer surface of the first transfer roller 104c is filled into the pair of second groove portions h2 and a surplus is scraped off by the first scraper 105a brought into sliding contact with the outer peripheral surface of the first transfer roller 104c.

Similarly, the ceramic dielectric slurry 120 shifted to the outer surface of the second transfer roller 104d is filled into the pair of second groove portions h2 and a surplus is scraped off by the second scraper 105b brought into sliding contact with the outer peripheral surface of the second transfer roller 104d.

Next, a plurality of ceramic element assemblies 2 on which the first outer electrode 5, the second outer electrode 6, the third outer electrode 7, and the fourth outer electrode 8 have been formed are preferably sequentially moved through a space between the first transfer roller 104c and the second transfer roller 104d in a transport direction indicated by an arrow 107 while being nipped by the first transfer roller 104c and the second transfer roller 104d. The plurality of ceramic element assemblies 2 are supported by attaching carrier tapes 106 to the first outer electrode 5 and the second outer electrode 6, respectively.

The length direction L of the ceramic element assembly and the direction of the rotation axis ax are parallel or substantially parallel to each other, and the thickness direction T of the ceramic element assembly 2 and the transport direction of the ceramic element assembly 2 are parallel or substantially parallel to each other. The transport speed of the ceramic element assembly 2 and the rotation speed of the outer periphery of each of the first transfer roller 104c and the second transfer roller 104d are equal or substantially equal to each other.

Figure 11:
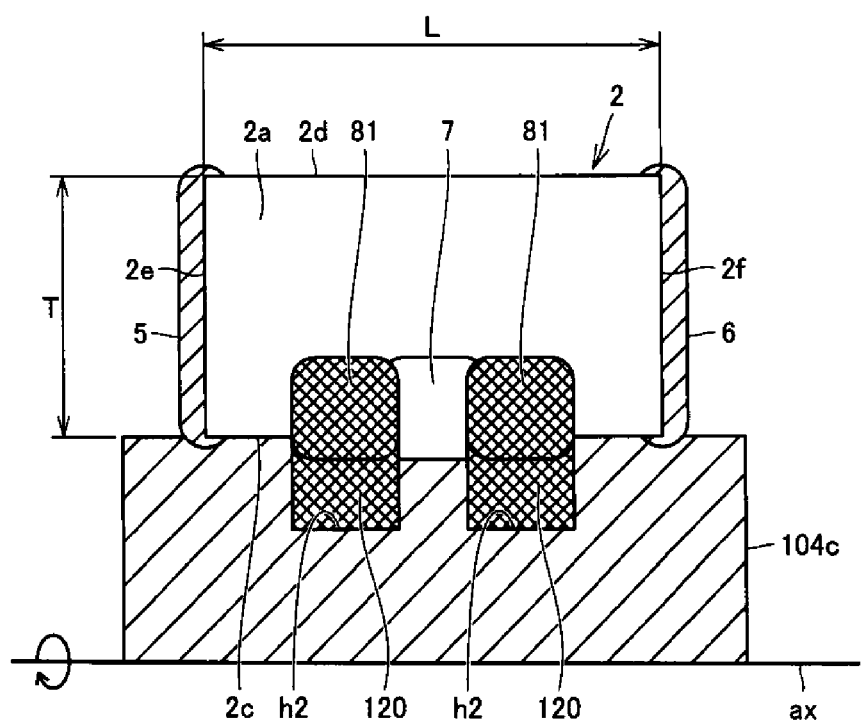
FIG. 11 is a cross-sectional view illustrating a state in which the first transfer roller of the applicator illustrated in FIG. 9 and the ceramic element assembly are held in contact with each other.

FIG. 11 is a cross-sectional view illustrating a state in which the first transfer roller of the applicator illustrated in FIG. 9 and the ceramic element assembly are held in contact with each other.

As illustrated in FIGS. 9 and 11, a portion of the ceramic dielectric slurry 120 filled in the pair of second groove portions h2 of the first transfer roller 104c is transferred over a region from the first lateral surface 2c of the ceramic element assembly 2 to a portion of each of the first principal surface 2a and the second principal surface 2b thereof, thus forming a pair of first insulating coating patterns 81.

Similarly, a portion of the ceramic dielectric slurry 120 filled in the pair of second groove portions h2 of the second transfer roller 104d is transferred over a region from the second lateral surface 2d of the ceramic element assembly 2 to a portion of each of the first principal surface 2a and the second principal surface 2b thereof, thus forming a pair of second insulating coating patterns.

Because the width of each of the pair of second groove portions h2 is larger than the width of the first groove portion h1, the maximum thickness of the pair of first insulating coating patterns 81 on the first lateral surface 2c, therefore, the maximum thickness of the pair of first insulating coating portions 11 on the first lateral surface 2c, is larger than the maximum thickness of the third outer electrode 7 on the first lateral surface 2c. Similarly, the maximum thickness of the pair of second insulating coating patterns on the second lateral surface 2d, therefore, the maximum thickness of the pair of second insulating coating portions 12 on the second lateral surface 2d, is larger than the maximum thickness of the fourth outer electrode 8 on the second lateral surface 2d.

Next, the pair of first insulating coating patterns 81 and the pair of second insulating coating patterns that have been formed on the ceramic element assembly 2 are baked. Thus, the pair of first insulating coating portions 11 and the pair of second insulating coating portions 12 are formed on the outer surface of the ceramic element assembly 2 (Step S10). The baking temperature is set lower than the firing temperature of the multilayer chip. When the material of the pair of first insulating coating portions and the pair of second insulating coating portions 12 is a dielectric ceramic, the baking temperature is preferably, for example, about 900° C. When the material of the pair of first insulating coating portions 11 and the pair of second insulating coating portions 12 is a resin, the baking temperature is preferably, for example, about 300° C. When the material of the pair of first insulating coating portions 11 and the pair of second insulating coating portions 12 is a glass, the baking temperature is preferably, for example, about 600° C. or more and about 750° C. or less.

Next, the ceramic element assembly 2 on which the underlying electrode layer has been formed is plated. The underlying electrode layer is subjected to nickel plating and tin plating in this order to form a nickel plating layer and a tin plating layer. Thus, the first outer electrode 5, the second outer electrode 6, the third outer electrode 7, and the fourth outer electrode 8 are formed on the outer surface of the ceramic element assembly 2 (Step S11).

Through the series of steps described above, the multilayer ceramic capacitor 1 is able to be manufactured.

As described above, in the multilayer ceramic capacitor according to the first preferred embodiment, the inner end portions 11a of the pair of first insulating coating portions 11 are held in contact with the third outer electrode, and the inner end portions 12a of the pair of second insulating coating portions 12 are held in contact with the fourth outer electrode. Thus, even when the length of the end portion 42b1 of the first extended electrode portion 42b in the length direction L and the length of the end portion 42c1 of the second extended electrode portion 42c in the length direction L are set so as to become close to the lengths of the third outer electrode 7 and the fourth outer electrode 8 in the length direction but the end portion 42b1 of the first extended electrode portion 42b and the end portion 42c1 of the second extended electrode portion 42c extend out of the regions of the third outer electrode 7 and the fourth outer electrode 8 due to processing variations at the time of manufacturing, the extending portions are covered with the pair of first insulating coating portions 11 and the pair of second insulating coating portions 12 and are therefore prevented from being exposed to the outside. As a result, the reliability of the multilayer ceramic capacitor 1 is secured.

Further, the length of the end portion 42b1 of the first extended electrode portion 42b in the length direction L and the length of the end portion 42c1 of the second extended electrode portion 42c in the length direction L are set so as to become close to the lengths of the third outer electrode 7 and the fourth outer electrode 8 in the length direction, thus being capable of reducing the size of, for example, a loop defined by a path of a current flowing through the first inner electrode layer 41 from the first outer electrode 5 side, reaching the second inner electrode layer 42, and further flowing through the extended electrode portions 42b and 42c of the second inner electrode layer 42. Thus, equivalent series inductance (ESL) is reduced.

Moreover, as described above, the end portion 42b1 of the first extended electrode portion 42b located on the first lateral surface 2c side is provided so as to extend in the length direction L out of the region where the third outer electrode 7 is provided, and the end portion 42c1 of the second extended electrode portion 42c located on the second lateral surface 2d side is provided so as to extend in the length direction L out of the region where the fourth outer electrode 8 is provided, thus being capable of further reducing the size of the loop defined by the path of the current flowing through the first inner electrode layer 41 from the first outer electrode 5 side, reaching the second inner electrode layer 42, and further flowing through the extended electrode portions 42b and 42c of the second inner electrode layer. Thus, the equivalent series inductance (ESL) is further reduced.

Even when the end portion 42b1 of the first extended electrode portion 42b and the end portion 42c1 of the second extended electrode portion 42c are provided so as to extend out of the regions of the third outer electrode 7 and the fourth outer electrode 8 in the length direction L, the end portion 42b1 of the first extended electrode portion 42b is located within the region where the pair of first insulating coating portions 11 and the third outer electrode 7 are provided, and the end portion 42c1 of the second extended electrode portion 42c is located within the region where the pair of second insulating coating portions 12 and the fourth outer electrode 8 are provided, thus preventing the end portion 42b1 of the first extended electrode portion 42b and the end portion 42c1 of the second extended electrode portion 42c from being exposed to the outside. As a result, the reliability of the multilayer ceramic capacitor 1 is secured.

In addition, the inner end portions 11a of the pair of first insulating coating portions 11 in the length direction L are provided so as to cover the third outer electrode 7, and the inner end portions 12a of the pair of second insulating coating portions 12 in the length direction L are provided so as to cover the fourth outer electrode 8, thus being capable of suppressing peeling of the third outer electrode 7 and the fourth outer electrode 8 from the ceramic element assembly 2.

Modified Example 1

Figure 12:
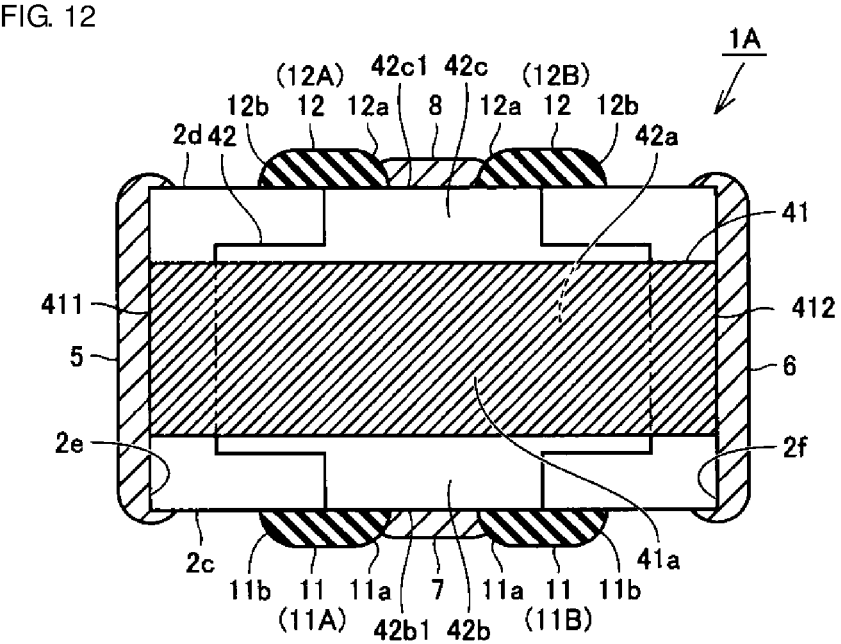
FIG. 12 is a horizontal cross-sectional view of a multilayer ceramic capacitor according to Modified Example 1.

FIG. 12 is a horizontal cross-sectional view of a multilayer ceramic capacitor according to Modified Example 1 of a preferred embodiment of the present invention. A multilayer ceramic capacitor 1A according to Modified Example 1 is described with reference to FIG. 12.

As illustrated in FIG. 12, the multilayer ceramic capacitor 1A according to Modified Example 1 is different from the multilayer ceramic capacitor 1 according to the first preferred embodiment in that the order of overlap between the third outer electrode 7 and the pair of first insulating coating portions 11 and the order of overlap between the fourth outer electrode 8 and the pair of second insulating coating portions 12 are reversed. The other components are substantially similar.

The inner end portions 11a of the pair of first insulating coating portions 11 in the length direction L are covered with both ends of the third outer electrode 7.

Specifically, the end portion 11a on the second outer electrode 6 side of the one first insulating coating portion 11A is covered with the end portion on the first outer electrode 5 side of the third outer electrode 7, and the end portion 11a on the first outer electrode 5 side of the other first insulating coating portion 11B is covered with the end portion on the second outer electrode 6 side of the third outer electrode 7.

The inner end portions 12a of the pair of second insulating coating portions 12 in the length direction L are covered with the fourth outer electrode 8.

Specifically, the end portion 12a on the second outer electrode 6 side of the one second insulating coating portion 12A is covered with the end portion on the first outer electrode 5 side of the fourth outer electrode 8, and the end portion 12a on the first outer electrode 5 side of the other second insulating coating portion 12B is covered with the end portion on the second outer electrode 6 side of the fourth outer electrode 8.

The multilayer ceramic capacitor 1A according to Modified Example 1 is preferably manufactured in accordance with the method of manufacturing the multilayer ceramic capacitor according to the first preferred embodiment. In Modified Example 1, Step S10 (insulating coating portion forming step) according to the first preferred embodiment is performed prior to Step S9 (underlying electrode layer forming step).

Also in the multilayer ceramic capacitor 1A according to Modified Example 1 that is constructed as described above, advantages substantially similar to those of the first preferred embodiment are attained.

Further, by providing the pair of first insulating coating portions 11 and the pair of second insulating coating portions 12 prior to the first outer electrode 5, the second outer electrode 6, the third outer electrode 7, and the fourth outer electrode 8, the pair of first insulating coating portions 11 and the pair of second insulating coating portions 12 function as banks when the conductive paste 110 used in forming the outer electrodes is applied. As a result, the first outer electrode pattern, the second outer electrode pattern, the third outer electrode pattern, and the fourth outer electrode pattern are prevented from being coupled to each other.

Second Preferred Embodiment

Figure 13:
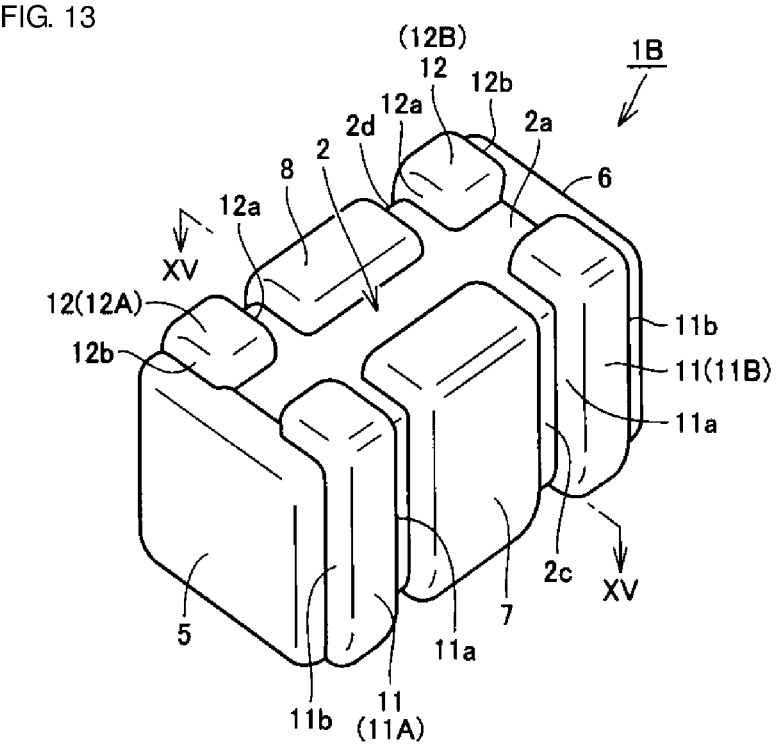
FIG. 13 is a perspective view of a multilayer ceramic capacitor according to a second preferred embodiment of the present invention.
Figure 14:
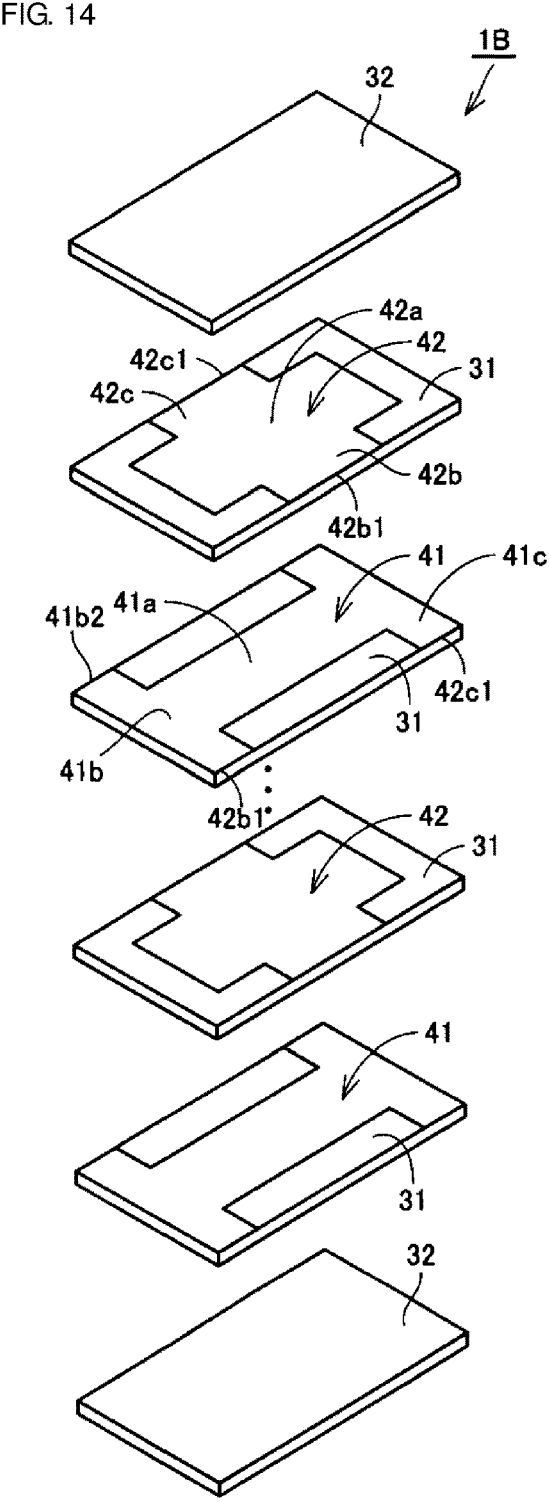
FIG. 14 is an exploded perspective view of a ceramic element assembly included in the multilayer ceramic capacitor according to the second preferred embodiment of the present invention.
Figure 15:
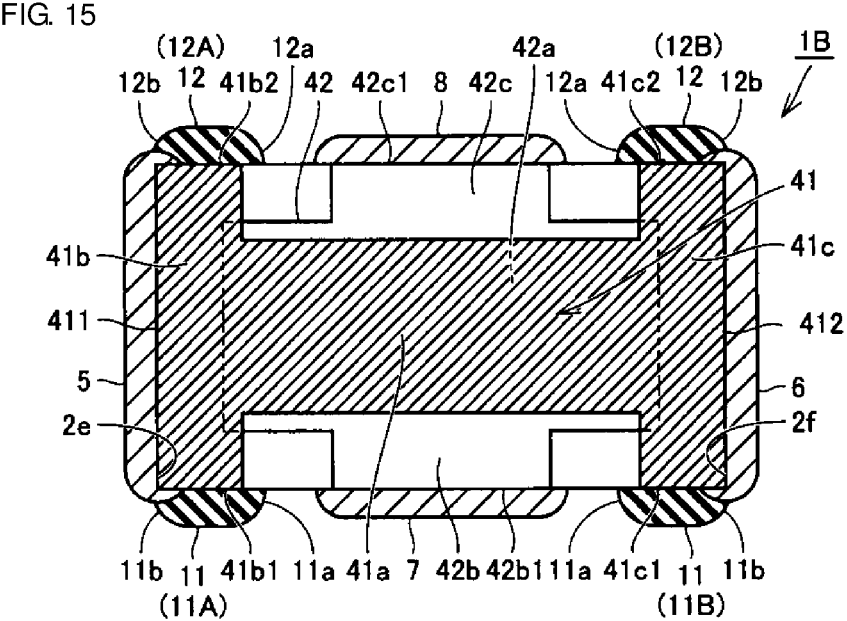
FIG. 15 is a horizontal cross-sectional view of the multilayer ceramic capacitor according to the second preferred embodiment, which is taken along the line XV-XV illustrated in FIG. 13.

FIG. 13 is a perspective view of a multilayer ceramic capacitor according to a second preferred embodiment of the present invention. FIG. 14 is an exploded perspective view of a ceramic element assembly included in the multilayer ceramic capacitor according to the second preferred embodiment. FIG. 15 is a horizontal cross-sectional view of the multilayer ceramic capacitor according to the second preferred embodiment, which is taken along the line XV-XV illustrated in FIG. 13. A multilayer ceramic capacitor 1B according to the second preferred embodiment is described with reference to FIG. 13 to FIG. 15.

As illustrated in FIG. 13 to FIG. 15, the multilayer ceramic capacitor 1B according to the second preferred embodiment is preferably different from the multilayer ceramic capacitor 1 according to the first preferred embodiment in terms of the positions where the pair of first insulating coating portions 11 and the pair of second insulating coating portions 12 are provided, the lengths of the third outer electrode 7 and the fourth outer electrode 8 in the length direction L, and the shapes of the first inner electrode layer 41 and the second inner electrode layer 42. The other components are substantially similar.

As illustrated in FIG. 13, the pair of first insulating coating portions 11 are provided close to both ends of the first lateral surface 2c in the length direction L. The pair of second insulating coating portions 12 are provided close to both ends of the second lateral surface 2d in the length direction L.

The pair of first insulating coating portions 11 is in a state in which the outer end portions of the pair of first insulating coating portions 11 are held in contact with the first outer electrode 5 and the second outer electrode 6, and the pair of second insulating coating portions 12 is in a state in which the outer end portions of the pair of second insulating coating portions 12 are held in contact with the first outer electrode 5 and the second outer electrode 6.

Specifically, as illustrated in FIG. 13 and FIG. 15, one of the outer end portions 11b of the pair of first insulating coating portions 11 in the length direction L which is located on the first outer electrode 5 side preferably covers the first outer electrode 5, and the other one of the outer end portions 11b of the pair of first insulating coating portions 11 in the length direction L which is located on the second outer electrode 6 side preferably covers the second outer electrode 6.

Further, one of the outer end portions 12b of the pair of second insulating coating portions 12 in the length direction L which is located on the first outer electrode 5 side covers the first outer electrode 5, and the other one of the outer end portions 12b of the pair of second insulating coating portions 12 in the length direction which is located on the second outer electrode 6 side covers the second outer electrode 6.

The pair of first insulating coating portions 11 is in a state in which the inner end portions 11a of the pair of first insulating coating portions 11 are kept out of contact with the third outer electrode 7. Specifically, the end portion 11a on the second outer electrode 6 side of the one first insulating coating portion 11A is located away from the third outer electrode 7, and the end portion 11a on the first outer electrode 5 side of the other first insulating coating portion 11B is located away from the third outer electrode 7.

Similarly, the pair of second insulating coating portions 12 is in a state in which the inner end portions 12a of the pair of second insulating coating portions 12 are kept out of contact with the fourth outer electrode 8. Specifically, the end portion 12a on the fourth outer electrode 8 side of the one second insulating coating portion 12A is located away from the fourth outer electrode 8, and the end portion 12a on the fourth outer electrode 8 side of the other second insulating coating portion 12B is located away from the fourth outer electrode 8.

With the structures of the pair of first insulating coating portions 11 and the pair of second insulating coating portions 12 described above, the distance between the pair of first insulating coating portions 11 and the distance between the pair of second insulating coating portions 12 in the length direction L are longer than those of the first preferred embodiment. Along with this, in the second preferred embodiment, the length of the third outer electrode 7 and the length of the fourth outer electrode 8 in the length direction L are larger than the length of the third outer electrode 7 and the length of the fourth outer electrode 8 in the length direction L according to the first preferred embodiment.

As illustrated in FIG. 14, the second inner electrode layer 42 according to the second preferred embodiment is structured so that the lengths of the first extended electrode portion 42b and the second extended electrode portion 42c in the length direction L become larger than those of the second inner electrode layer 42 according to the first preferred embodiment. Specifically, the lengths of the end portion 42b1 of the first extended electrode portion 42b and the end portion 42c1 of the second extended electrode portion 42c in the length direction L according to the second preferred embodiment are preferably larger than the lengths of the end portion 42b1 of the first extended electrode portion 42b and the end portion 42c1 of the second extended electrode portion 42c in the length direction L according to the first preferred embodiment.

The first inner electrode layer 41 according to the second preferred embodiment preferably includes the second opposed electrode portion 41a, a third extended electrode portion 41b, and a fourth extended electrode portion 41c. The second opposed electrode portion 41a faces the first opposed electrode portion 42a of the second inner electrode layer 42.

The third extended electrode portion 41b extends from the second opposed electrode portion 41a to the first end surface 2e so as to reach the first outer electrode 5. The third extended electrode portion 41b includes a first extended end portion 41b1 extended to the first lateral surface 2c, and a second extended end portion 41b2 extended to the second lateral surface 2d.

The fourth extended electrode portion 41c extends from the second opposed electrode portion 41a to the second end surface 2f so as to reach the second outer electrode 6. The fourth extended electrode portion 41c includes a third extended end portion 41c1 extended to the first lateral surface 2c, and a fourth extended end portion 41c2 extended to the second lateral surface 2d.

As illustrated in FIG. 15, the first extended end portion 41b1 is located within a region on the first lateral surface 2c where the one first insulating coating portion 11A out of the pair of first insulating coating portions 11 which is located on the first end surface 2e side and the first outer electrode 5 are provided.

The second extended end portion 41b2 is located within a region on the second lateral surface 2d where the one second insulating coating portion 12A out of the pair of second insulating coating portions 12 which is located on the first end surface 2e side and the first outer electrode 5 are provided.

The third extended end portion 41c1 is located within a region on the first lateral surface 2c where the other first insulating coating portion 11B out of the pair of first insulating coating portions 11 which is located on the second end surface 2f side and the second outer electrode 6 are provided.

The fourth extended end portion 41c2 is located within a region on the second lateral surface 2d where the other second insulating coating portion 12B out of the pair of second insulating coating portions 12 which is located on the second end surface 2f side and the second outer electrode 6 are provided.

Further, the end portion 42b1 of the first extended electrode portion 42b of the second inner electrode layer 42 which is located on the first lateral surface 2c side is located within the region where the third outer electrode 7 is provided. The end portion 42c1 of the second extended electrode portion 42c of the second inner electrode layer 42 which is located on the second lateral surface 2d side is located within the region where the fourth outer electrode 8 is provided.

The multilayer ceramic capacitor 1B according to the second preferred embodiment is preferably manufactured in accordance with the method of manufacturing the multilayer ceramic capacitor according to the first preferred embodiment. In the second preferred embodiment, a first transfer roller 104a and a second transfer roller 104b each having a wide first groove portion h1 are used in a step conforming to Step S9 (underlying electrode layer forming step) according to the first preferred embodiment, and a first transfer roller 104c and a second transfer roller 104d each having a pair of second groove portions h2 provided close to both ends in the direction of the rotation axis ax are used in a step conforming to Step S10 (insulating coating portion forming step) according to the first preferred embodiment.

When the multilayer ceramic capacitor 1B according to the second preferred embodiment is manufactured, a process substantially similar to that of Step S1 to Step S8 according to the first preferred embodiment is preferably performed. Next, an underlying electrode layer of each of the first outer electrode 5, the second outer electrode 6, the third outer electrode 7, and the fourth outer electrode 8 according to the second preferred embodiment is formed by performing the step conforming to Step S9 (underlying electrode layer forming step) according to the first preferred embodiment by using the first transfer roller 104a and the second transfer roller 104b described above. Next, the pair of first insulating coating portions 11 and the pair of second insulating coating portions 12 according to the second preferred embodiment are formed by performing the step conforming to Step S10 (insulating coating portion forming step) according to the first preferred embodiment by using the first transfer roller 104c and the second transfer roller 104d described above. Then, Step S11 (plating layer forming step) according to the first preferred embodiment is performed, thus manufacturing the multilayer ceramic capacitor 1B according to the second preferred embodiment.

As described above, in the multilayer ceramic capacitor 1B according to the second preferred embodiment, the outer end portions 11b of the pair of first insulating coating portions 11 are held in contact with the first outer electrode 5 and the second outer electrode 6, and the outer end portions 12b of the pair of second insulating coating portions 12 are held in contact with the first outer electrode 5 and the second outer electrode 6. Therefore, even when the third extended electrode portion 41b of the first inner electrode layer 41 includes the first extended end portion 41b1 extended to the first lateral surface 2c and the second extended end portion 41b2 extended to the second lateral surface 2d and the fourth extended electrode portion 41c of the first inner electrode layer 41 is structured so as to have the third extended end portion 41c1 extended to the first lateral surface 2c and the fourth extended end portion 41c2 extended to the second lateral surface 2d, the first extended end portion 41b1 and the second extended end portion 41b2 of the third extended electrode portion 41b are able to be covered with the one first insulating coating portion 11A and the one second insulating coating portion 12A, and the third extended end portion 41c1 and the fourth extended end portion 41c2 of the fourth extended electrode portion 41c are able to be covered with the other first insulating coating portion 11B and the other second insulating coating portion 12B. Thus, the first extended end portion 41b1 and the second extended end portion 41b2 of the third extended electrode portion 41b and the third extended end portion 41c1 and the fourth extended end portion 41c2 of the fourth extended electrode portion 41c are able to be prevented from being exposed to the outside. As a result, the reliability of the multilayer ceramic capacitor 1B is secured.

Further, the third extended electrode portion 41b preferably includes the first extended end portion 41b1 extended to the first lateral surface 2c and the second extended end portion 41b2 extended to the second lateral surface 2d, and the fourth extended electrode portion 41c of the first inner electrode layer 41 includes the third extended end portion 41c1 extended to the first lateral surface 2c and the fourth extended end portion 41c2 extended to the second lateral surface 2d. Therefore, even when the end portion 42b1 of the first extended electrode portion 42b of the second inner electrode layer 42 which is located on the first lateral surface 2c side is located within the region where the third outer electrode 7 is provided and the end portion 42c1 of the second extended electrode portion 42c of the second inner electrode layer 42 which is located on the second lateral surface 2d side is located within the region where the fourth outer electrode 8 is provided, it is possible to reduce the size of, for example, the loop defined by the path of the current flowing through the first inner electrode layer 41 from the first outer electrode 5 side, reaching the second inner electrode layer 42, and further flowing through the extended electrode portions 42b and 42c of the second inner electrode layer 42. As a result, the equivalent series inductance (ESL) is reduced.

Moreover, the lengths of the end portion 42b1 of the first extended electrode portion 42b and the end portion 42c1 of the second extended electrode portion 42c in the length direction L are set larger than the lengths of the end portion 42b1 of the first extended electrode portion 42b and the end portion 42c1 of the second extended electrode portion 42c in the length direction L according to the first preferred embodiment, thus being capable of further reducing the size of the loop described above. As a result, the equivalent series inductance (ESL) is further reduced compared with the first preferred embodiment.

In addition, one of the outer end portions 11b of the pair of first insulating coating portions 11 in the length direction L which is located on the first outer electrode 5 side covers the first outer electrode 5, and the other one of the outer end portions 11b of the pair of first insulating coating portions 11 in the length direction L which is located on the second outer electrode 6 side covers the second outer electrode 6. Further, one of the outer end portions 12b of the pair of second insulating coating portions 12 in the length direction L which is located on the first outer electrode 5 side covers the first outer electrode 5, and the other one of the outer end portions 12b of the pair of second insulating coating portions 12 in the length direction which is located on the second outer electrode 6 side covers the second outer electrode 6. Thus, it is possible to reduce or prevent peeling of the first outer electrode 5 and the second outer electrode 6 from the ceramic element assembly 2.

Third Preferred Embodiment

Figure 16:
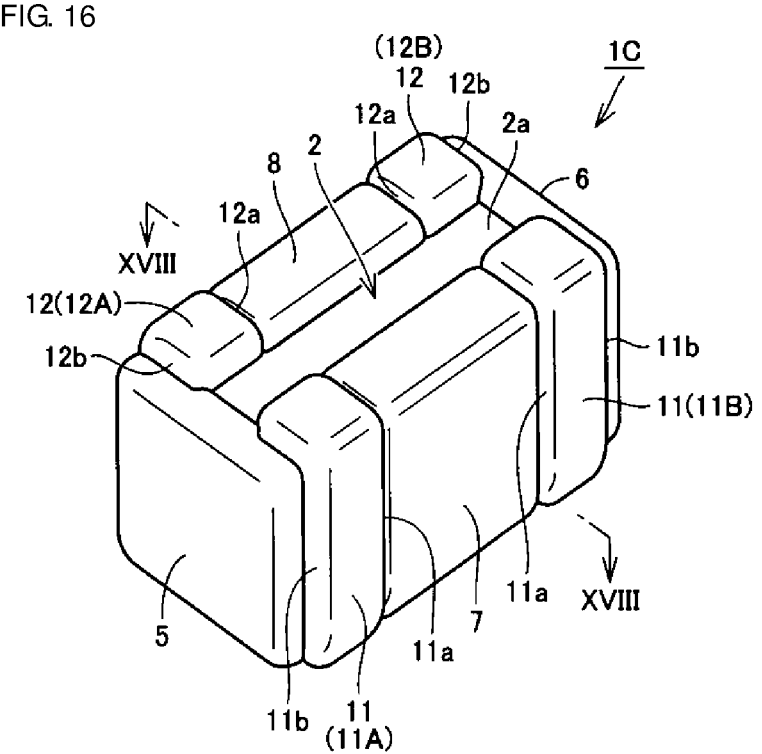
FIG. 16 is a perspective view of a multilayer ceramic capacitor according to a third preferred embodiment of the present invention.
Figure 17:
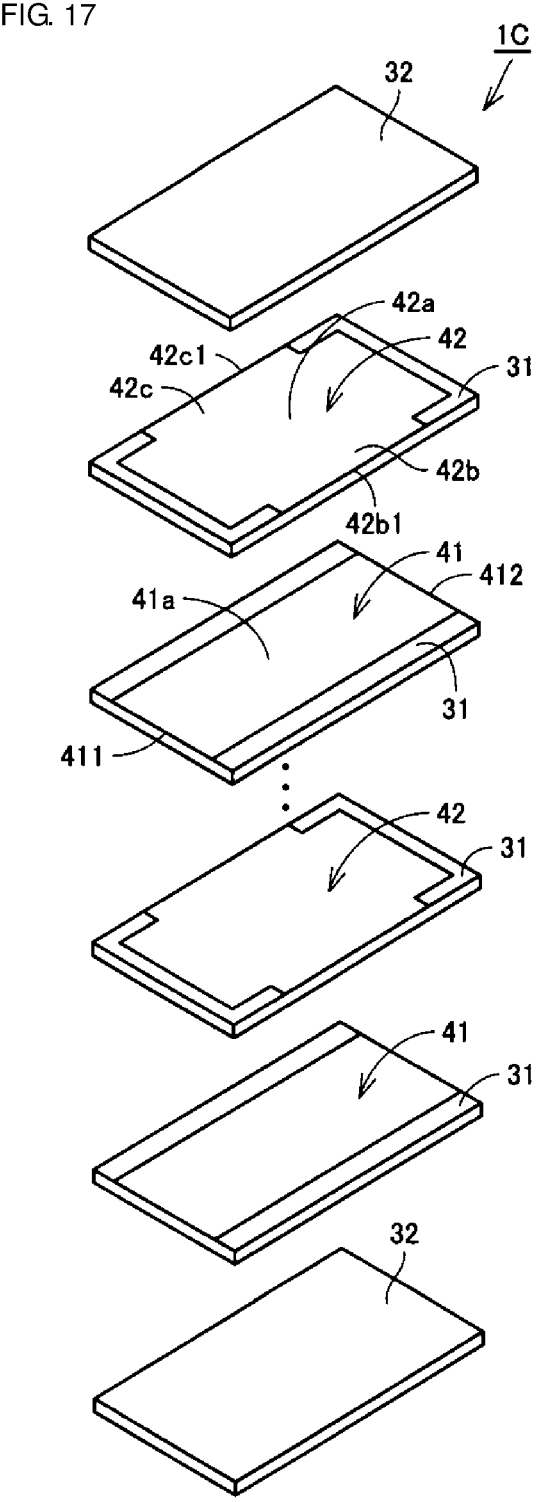
FIG. 17 is an exploded perspective view of a ceramic element assembly included in the multilayer ceramic capacitor according to the third preferred embodiment of the present invention.
Figure 18:
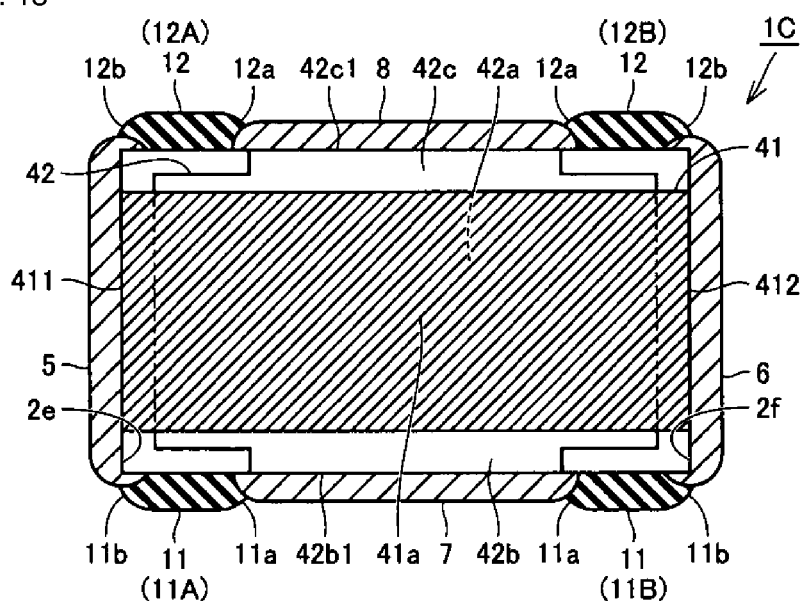
FIG. 18 is a horizontal cross-sectional view of the multilayer ceramic capacitor according to the third preferred embodiment, which is taken along the line XVIII-XVIII illustrated in FIG. 16.

FIG. 16 is a perspective view of a multilayer ceramic capacitor according to a third preferred embodiment of the present invention. FIG. 17 is an exploded perspective view of a ceramic element assembly included in the multilayer ceramic capacitor according to the third preferred embodiment. FIG. 18 is a horizontal cross-sectional view of the multilayer ceramic capacitor according to the third preferred embodiment, which is taken along the line XVIII-XVIII illustrated in FIG. 16. A multilayer ceramic capacitor 1C according to the third preferred embodiment is described with reference to FIG. 16 to FIG. 18.

As illustrated in FIG. 16 to FIG. 18, the multilayer ceramic capacitor 1C according to the third preferred embodiment is preferably different from the multilayer ceramic capacitor 1 according to the first preferred embodiment in terms of the positions and states of the pair of first insulating coating portions 11 and the pair of second insulating coating portions 12, the lengths of the third outer electrode 7 and the fourth outer electrode 8 in the length direction L, and the shapes of the first inner electrode layer 41 and the second inner electrode layer 42. The other components are substantially similar.

As illustrated in FIG. 16, the pair of first insulating coating portions 11 are provided close to both ends of the first lateral surface 2c in the length direction L. The pair of second insulating coating portions 12 are provided close to both ends of the second lateral surface 2d in the length direction L.

In the third preferred embodiment, the length of the third outer electrode 7 and the length of the fourth outer electrode 8 in the length direction L are larger than the length of the third outer electrode 7 and the length of the fourth outer electrode 8 in the length direction L according to the first preferred embodiment and the second preferred embodiment.

Along with this, the pair of first insulating coating portions 11 is in a state in which the inner end portions 11a of the pair of first insulating coating portions 11 in the length direction L are held in contact with the third outer electrode 7 and the outer end portions 11b of the pair of first insulating coating portions 11 in the length direction L are held in contact with the first outer electrode 5 and the second outer electrode 6. Further, the pair of second insulating coating portions 12 is in a state in which the inner end portions 12a of the pair of second insulating coating portions 12 in the length direction L are held in contact with the fourth outer electrode 8 and the outer end portions 12b of the pair of second insulating coating portions 12 in the length direction L are held in contact with the first outer electrode 5 and the second outer electrode 6.

Specifically, on the first lateral surface 2c side, the inner end portions 11a of the pair of first insulating coating portions 11 in the length direction L cover the third outer electrode 7. Further, one of the outer end portions 11b of the pair of first insulating coating portions 11 in the length direction L which is located on the first outer electrode 5 side covers the first outer electrode 5, and the other one of the outer end portions 11b of the pair of first insulating coating portions 11 in the length direction L which is located on the second outer electrode 6 side covers the second outer electrode 6.

Further, on the second lateral surface 2d side, the inner end portions 12a of the pair of second insulating coating portions 12 in the length direction L cover the fourth outer electrode 8. Further, one of the outer end portions 12b of the pair of second insulating coating portions 12 in the length direction L which is located on the first outer electrode 5 side covers the first outer electrode 5, and the other one of the outer end portions of the pair of second insulating coating portions 12 in the length direction L which is located on the second outer electrode 6 side covers the second outer electrode 6.

As illustrated in FIG. 17, the first inner electrode layer 41 according to the third preferred embodiment preferably has a band or substantially band shape similarly to the first inner electrode layer 41 according to the first preferred embodiment.

Further, the second inner electrode layer 42 according to the third preferred embodiment is structured so that the lengths of the first extended electrode portion 42b and the second extended electrode portion 42c in the length direction L become larger than those of the second inner electrode layer 42 according to the first preferred embodiment and the second preferred embodiment.

In the second inner electrode layer 42, the end portion 42b1 of the first extended electrode portion 42b located on the first lateral surface 2c side is preferably located within the region where the pair of first insulating coating portions 11 and the third outer electrode 7 are provided, and the end portion 42c1 of the second extended electrode portion 42c located on the second lateral surface 2d side is preferably located within the region where the pair of second insulating coating portions 12 and the fourth outer electrode 8 are provided.

Specifically, the end portion 42b1 of the first extended electrode portion 42b is preferably located within the region on the first lateral surface 2c where the third outer electrode 7 is provided, and the end portion 42c1 of the second extended electrode portion 42c is preferably located within the region on the second lateral surface 2d where the fourth outer electrode 8 is provided.

The multilayer ceramic capacitor 1C according to the third preferred embodiment is preferably manufactured basically in accordance with the method of manufacturing the multilayer ceramic capacitor according to the first preferred embodiment. In the third preferred embodiment, a first transfer roller 104a and a second transfer roller 104b each including a wide first groove portion h1 are used in a step conforming to Step S9 (underlying electrode layer forming step) according to the first preferred embodiment, and a first transfer roller 104c and a second transfer roller 104d each including a pair of second groove portions h2 provided close to both ends in the direction of the rotation axis ax are used in a step conforming to Step S10 (insulating coating portion forming step) according to the first preferred embodiment.

When the multilayer ceramic capacitor 1C according to the third preferred embodiment is manufactured, a process substantially similar to that of Step S1 to Step S8 according to the first preferred embodiment is preferably performed. Next, an underlying electrode layer of each of the first outer electrode 5, the second outer electrode 6, the third outer electrode 7, and the fourth outer electrode 8 according to the third preferred embodiment is formed by performing the step conforming to Step S9 (underlying electrode layer forming step) according to the first preferred embodiment by using the first transfer roller 104a and the second transfer roller 104b described above. Next, the pair of first insulating coating portions 11 and the pair of second insulating coating portions 12 according to the third preferred embodiment are formed by performing the step conforming to Step S10 (insulating coating portion forming step) according to the first preferred embodiment by using the first transfer roller 104c and the second transfer roller 104d described above. Then, Step S11 (plating layer forming step) according to the first preferred embodiment is performed, thus manufacturing the multilayer ceramic capacitor 1C according to the third preferred embodiment.

As described above, in the multilayer ceramic capacitor 1C according to the third preferred embodiment, the pair of first insulating coating portions 11 is preferably in a state in which the inner end portions 11a of the pair of first insulating coating portions 11 in the length direction L are held in contact with the third outer electrode 7 and the outer end portions 11b of the pair of first insulating coating portions 11 in the length direction L are held in contact with the first outer electrode 5 and the second outer electrode 6. Further, the pair of second insulating coating portions 12 is preferably in a state in which the inner end portions 12a of the pair of second insulating coating portions 12 in the length direction L are held in contact with the fourth outer electrode 8 and the outer end portions 12b of the pair of second insulating coating portions 12 in the length direction L are held in contact with the first outer electrode 5 and the second outer electrode 6.

Thus, even when the length of the end portion 42b1 of the first extended electrode portion 42b in the length direction L and the length of the end portion 42c1 of the second extended electrode portion 42c in the length direction L are preferably set to become close to the lengths of the third outer electrode 7 and the fourth outer electrode 8 in the length direction but the end portion 42b1 of the first extended electrode portion 42b and the end portion 42c1 of the second extended electrode portion 42c extend out of the regions of the third outer electrode 7 and the fourth outer electrode 8 due to processing variations at the time of manufacturing, the extending portions are covered with the pair of first insulating coating portions 11 and the pair of second insulating coating portions 12 and are therefore prevented from being exposed to the outside. As a result, the reliability of the multilayer ceramic capacitor 1C is secured.

Further, the length of the end portion 42b1 of the first extended electrode portion 42b in the length direction L and the length of the end portion 42c1 of the second extended electrode portion 42c in the length direction L are preferably set to become close to the lengths of the third outer electrode 7 and the fourth outer electrode 8 in the length direction, thus reducing the size of, for example, the loop defined by the path of the current flowing through the first inner electrode layer 41 from the first outer electrode 5 side, reaching the second inner electrode layer 42, and further flowing through the extended electrode portions 42b and 42c of the second inner electrode layer 42. Thus, the equivalent series inductance (ESL) is reduced.

Moreover, the lengths of the end portion 42b1 of the first extended electrode portion 42b and the end portion 42c1 of the second extended electrode portion 42c in the length direction L are preferably larger than the lengths of the end portion 42b1 of the first extended electrode portion 42b and the end portion 42c1 of the second extended electrode portion 42c in the length direction L according to the first preferred embodiment, thus further reducing the size of the loop described above. As a result, the equivalent series inductance (ESL) is further reduced as compared with the first preferred embodiment.

In addition, the first outer electrode 5 is preferably covered with the end portion on the first outer electrode 5 side of the one first insulating coating portion 11A and the end portion on the first outer electrode 5 side of the one second insulating coating portion 12A, and the second outer electrode 6 is preferably covered with the end portion on the second outer electrode 6 side of the other first insulating coating portion 11B and the end portion on the second outer electrode 6 side of the other second insulating coating portion 12B. Further, the third outer electrode 7 is covered with the inner end portions of the pair of first insulating coating portions 11, and the fourth outer electrode 8 is covered with the inner end portions of the pair of second insulating coating portions 12.

Thus, it is possible to reduce or prevent peeling of the first outer electrode 5, the second outer electrode 6, the third outer electrode 7, and the fourth outer electrode 8 from the ceramic element assembly 2.

Fourth Preferred Embodiment

Figure 19:
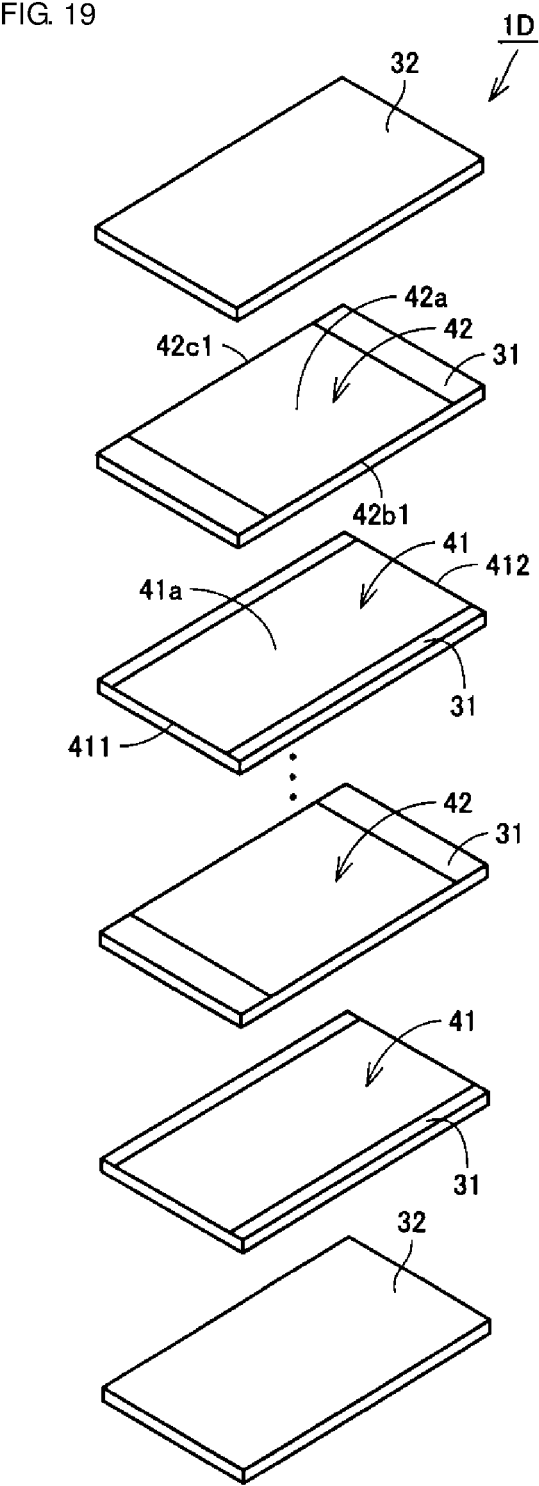
FIG. 19 is an exploded perspective view of a ceramic element assembly included in a multilayer ceramic capacitor according to a fourth preferred embodiment of the present invention.
Figure 20:
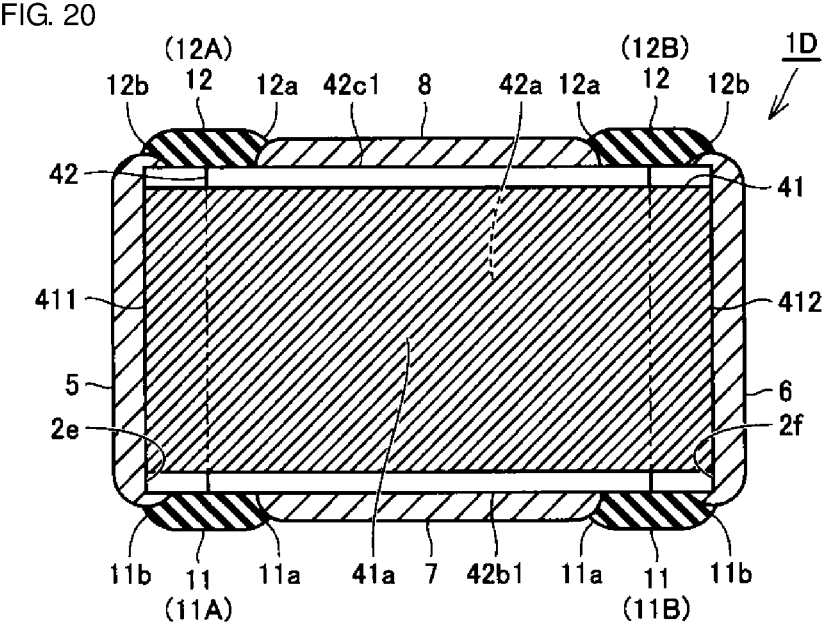
FIG. 20 is a horizontal cross-sectional view of the multilayer ceramic capacitor according to the fourth preferred embodiment.

FIG. 19 is an exploded perspective view of a ceramic element assembly included in a multilayer ceramic capacitor according to a fourth preferred embodiment of the present invention. FIG. 20 is a horizontal cross-sectional view of the multilayer ceramic capacitor according to the fourth preferred embodiment. A multilayer ceramic capacitor 1D according to the fourth preferred embodiment is described with reference to FIG. 19 and FIG. 20.

As illustrated in FIG. 19 and FIG. 20, the multilayer ceramic capacitor 1D according to the fourth preferred embodiment is preferably different from the multilayer ceramic capacitor 1C according to the third preferred embodiment in terms of the shapes of the first inner electrode layer 41 and the second inner electrode layer 42. The other components are substantially similar.

The first inner electrode layer 41 according to the fourth preferred embodiment is different from the first inner electrode layer 41 according to the third preferred embodiment in that the width in the width direction W is larger.

The second inner electrode layer 42 according to the fourth preferred embodiment preferably has a band or substantially band shape. The second inner electrode layer 42 according to the fourth preferred embodiment is defined such that the lengths of the first extended electrode portion 42b and the second extended electrode portion 42c in the length direction L become larger than those of the second inner electrode layer 42 according to the third preferred embodiment.

As illustrated in FIG. 20, the end portion 42b1 of the first extended electrode portion 42b located on the first lateral surface 2c side extends in the length direction L out of the region where the third outer electrode 7 is provided, and is located within the region where the pair of first insulating coating portions 11 and the third outer electrode 7 are provided.

The end portion 42c1 of the second extended electrode portion 42c located on the second lateral surface 2d side extends in the length direction L out of the region where the fourth outer electrode 8 is provided, and is located within the region where the pair of second insulating coating portions 12 and the fourth outer electrode 8 are provided.

The multilayer ceramic capacitor 1D according to the fourth preferred embodiment is able to be manufactured in accordance with the method of manufacturing the multilayer ceramic capacitor according to the third preferred embodiment. When the multilayer ceramic capacitor 1D according to the fourth preferred embodiment is preferably manufactured, a process similar or substantially similar to that of Step S1 to Step S11 according to the third preferred embodiment is performed. Thus, the multilayer ceramic capacitor 1D is manufactured.

By constructing the multilayer ceramic capacitor 1D as described above, advantages substantially similar to those of the third preferred embodiment are attained. In addition, as described above, the end portion 42b1 of the first extended electrode portion 42b located on the first lateral surface 2c side extends in the length direction L out of the region where the third outer electrode 7 is provided, and the end portion 42c1 of the second extended electrode portion 42c located on the second lateral surface 2d side extends in the length direction L out of the region where the fourth outer electrode 8 is provided. Thus, it is possible to further reduce the size of the loop defined by the path of the current flowing through the first inner electrode layer 41 from the first outer electrode 5 side, reaching the second inner electrode layer 42, and further flowing through the extended electrode portions 42b and 42c of the second inner electrode layer. As a result, the equivalent series inductance (ESL) is further reduced.

Fifth Preferred Embodiment

Figure 21:
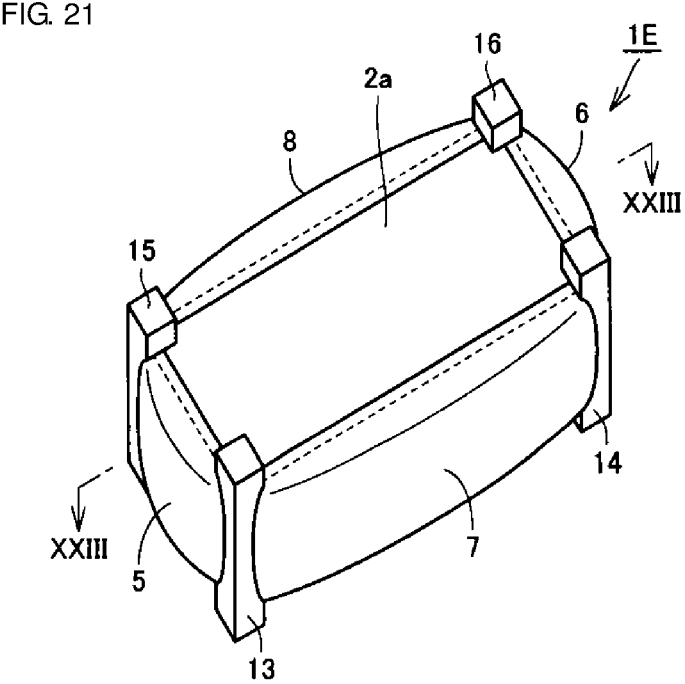
FIG. 21 is a perspective view of a multilayer ceramic capacitor according to a fifth preferred embodiment of the present invention.
Figure 22:
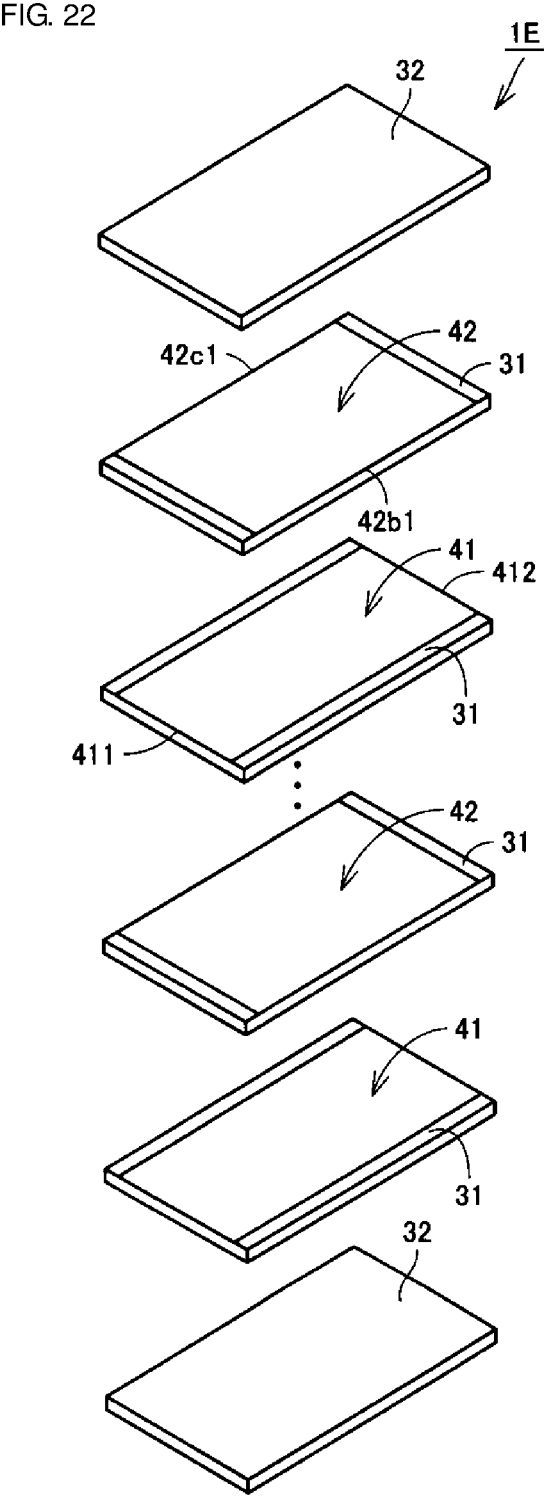
FIG. 22 is an exploded perspective view of a ceramic element assembly included in the multilayer ceramic capacitor according to the fifth preferred embodiment of the present invention.
Figure 23:
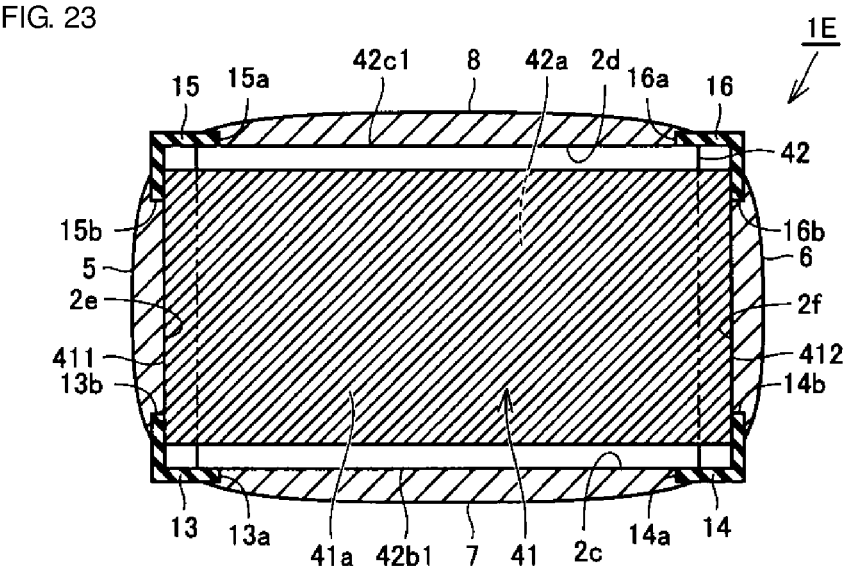
FIG. 23 is a horizontal cross-sectional view of the multilayer ceramic capacitor according to the fifth preferred embodiment, which is taken along the line XXIII-XXIII illustrated in FIG. 21.

FIG. 21 is a perspective view of a multilayer ceramic capacitor according to a fifth preferred embodiment of the present invention. FIG. 22 is an exploded perspective view of a ceramic element assembly included in the multilayer ceramic capacitor according to the fifth preferred embodiment. FIG. 23 is a horizontal cross-sectional view of the multilayer ceramic capacitor according to the fifth preferred embodiment, which is taken along the line XXIII-XXIII illustrated in FIG. 21. A multilayer ceramic capacitor 1E according to the fifth preferred embodiment is described with reference to FIG. 21 to FIG. 23.

As illustrated in FIG. 21 to FIG. 23, the multilayer ceramic capacitor 1E according to the fifth preferred embodiment includes the ceramic element assembly 2 as a multilayer body, the first outer electrode 5, the second outer electrode 6, the third outer electrode 7, the fourth outer electrode 8, a first insulating coating portion 13, a second insulating coating portion 14, a third insulating coating portion 15, and a fourth insulating coating portion 16.

The ceramic element assembly 2 preferably has a rectangular parallelepiped or substantially rectangular parallelepiped outer shape. The ceramic element assembly 2 includes the first end surface 2e and the second end surface 2f located opposite each other in the length direction L, the first lateral surface 2c and the second lateral surface 2d located opposite each other in the width direction W perpendicular or substantially perpendicular to the length direction L, and the first principal surface 2a and the second principal surface 2b located opposite each other in the thickness direction T perpendicular or substantially perpendicular to the length direction L and the width direction W.

The ceramic element assembly 2 is rectangular parallel or substantially parallelepiped defined by the plurality of dielectric layers 3 and the plurality of inner electrode layers 4 alternately laminated along the laminating direction that is the thickness direction T.

As illustrated in FIG. 22, the plurality of dielectric layers 3 include the plurality of inner dielectric layers 31 and the plurality of outer dielectric layers 32. The plurality of inner electrode layers 4 rectangular parallelepiped or substantially parallelepiped include the plurality of first inner electrode layers 41 and the plurality of second inner electrode layers 42.

The plurality of inner dielectric layers 31 are sandwiched by the plurality of outer dielectric layers 32. The first inner electrode layers 41 and the second inner electrode layers 42 are alternately located between the inner dielectric layers 31 adjacent to each other.

The second inner electrode layer 42 is provided on the surface of the inner dielectric layer 31. The second inner electrode layer 42 is connected to the third outer electrode 7 and the fourth outer electrode 8. The second inner electrode layer 42 includes the first opposed electrode portion 42a, the first extended electrode portion 42b, and the second extended electrode portion 42c.

The first opposed electrode portion 42a is a portion of the second inner electrode layer 42 which faces the first inner electrode layer 41. The first extended electrode portion 42b extends from the first opposed electrode portion 42a to the first lateral surface 2c so as to reach the third outer electrode 7. The first extended electrode portion 42b preferably includes the end portion 42b1 located on the first lateral surface 2c side. The second extended electrode portion 42c extends from the first opposed electrode portion 42a to the second lateral surface 2d so as to reach the fourth outer electrode 8. The second extended electrode portion 42c preferably includes the end portion 42c1 located on the second lateral surface 2d side.

The first inner electrode layer 41 is provided on the inner dielectric layer 31 different from the inner dielectric layer 31 where the second inner electrode layer 42 is provided. The first inner electrode layer 41 is provided on the surface of the inner dielectric layer 31. The first inner electrode layer 41 is connected to the first outer electrode 5 and the second outer electrode 6. The first inner electrode layer 41 includes the second opposed electrode portion 41a. The second opposed electrode portion 41a faces the first opposed electrode portion 42a of the second inner electrode layer 42. The first inner electrode layer 41 has the first end portion 411 extended to the first end surface 2e, and the second end portion 412 extended to the second end surface 2f.

Referring back to FIG. 21 and FIG. 23, the first outer electrode 5 reaches the first principal surface 2a and the second principal surface 2b from the first end surface 2e. The second outer electrode 6 reaches the first principal surface 2a and the second principal surface 2b from the second end surface 2f.

The third outer electrode 7 reaches the first principal surface 2a and the second principal surface 2b from the first lateral surface 2c. The fourth outer electrode 8 reaches the first principal surface 2a and the second principal surface 2b from the second lateral surface 2d.

The first insulating coating portion 13 is provided at a first ridge portion 21 between the first end surface 2e and the first lateral surface 2c. The first insulating coating portion 13 extends to the first end surface 2e, the first lateral surface 2c, the first principal surface 2a, and the second principal surface 2b.

The second insulating coating portion 14 is provided at a second ridge portion 22 between the second end surface 2f and the first lateral surface 2c. The second insulating coating portion 14 extends to the second end surface 2f, the first lateral surface 2c, the first principal surface 2a, and the second principal surface 2b.

The third insulating coating portion 15 is provided at a third ridge portion 23 between the first end surface 2e and the second lateral surface 2d. The third insulating coating portion 15 extends to the first end surface 2e, the second lateral surface 2d, the first principal surface 2a, and the second principal surface 2b.

The fourth insulating coating portion 16 is provided at a fourth ridge portion 24 between the second end surface 2f and the second lateral surface 2d. The fourth insulating coating portion 16 extends to the second end surface 2f, the second lateral surface 2d, the first principal surface 2a, and the second principal surface 2b.

As the material of the first insulating coating portion 13, the second insulating coating portion 14, the third insulating coating portion 15, and the fourth insulating coating portion 16, a dielectric ceramic, a resin, or a glass may preferably be used. When a dielectric ceramic is used as the material of the first insulating coating portion 13, the second insulating coating portion 14, the third insulating coating portion 15, and the fourth insulating coating portion 16, $BaTiO_3$, $CaTiO_3$, $SrTiO_3$, $CaZrO_3$, or the like may be used as a main component. Further, a Mn compound, a Mg compound, a Si compound, an Fe compound, a Cr compound, a Co compound, a Ni compound, an Al compound, a V compound, a rare-earth compound, or the like may be added to the main component as a subcomponent.

When a resin is used as the material of the first insulating coating portion 13, the second insulating coating portion 14, the third insulating coating portion 15, and the fourth insulating coating portion 16, a resin containing an epoxy resin or a polyimide resin is preferably used. In this case, the first insulating coating portion 13, the second insulating coating portion 14, the third insulating coating portion 15, and the fourth insulating coating portion 16 are provided by applying and thermally curing resin paste to and on the ceramic element assembly 2, for example.

When a glass is used as the material of the first insulating coating portion 13, the second insulating coating portion 14, the third insulating coating portion 15, and the fourth insulating coating portion 16, a glass containing Ba or Sr is used. In this case, the first insulating coating portion 13, the second insulating coating portion 14, the third insulating coating portion 15, and the fourth insulating coating portion 16 are preferably provided by applying and baking glass paste to and on the ceramic element assembly 2.

The first insulating coating portion 13 is in a state in which an end portion 13a located on the third outer electrode 7 side is held in contact with the third outer electrode 7 and an end portion 13b located on the first outer electrode 5 side is held in contact with the first outer electrode 5.

The second insulating coating portion 14 is in a state in which an end portion 14a located on the third outer electrode 7 side is held in contact with the third outer electrode 7 and an end portion 14b located on the second outer electrode 6 side is held in contact with the second outer electrode 6.

The third insulating coating portion 15 is in a state in which an end portion 15a located on the fourth outer electrode 8 side is held in contact with the fourth outer electrode 8 and an end portion 15b located on the first outer electrode 5 side is held in contact with the first outer electrode 5.

The fourth insulating coating portion 16 is in a state in which an end portion 16a located on the fourth outer electrode 8 side is held in contact with the fourth outer electrode 8 and an end portion 16b located on the second outer electrode 6 side is held in contact with the second outer electrode 6.

In the state of the first insulating coating portion 13 to the fourth insulating coating portion 16, the end portions on the first end surface 2e side of the first insulating coating portion 13 and the third insulating coating portion 15 are covered with the first outer electrode 5, and the end portions on the second end surface 2f side of the second insulating coating portion 14 and the fourth insulating coating portion 16 are covered with the second outer electrode 6. Further, the end portions on the first lateral surface 2c side of the first insulating coating portion 13 and the second insulating coating portion 14 are covered with the third outer electrode 7, and the end portions on the second lateral surface 2d side of the third insulating coating portion 15 and the fourth insulating coating portion 16 are covered with the fourth outer electrode 8.

As illustrated in FIG. 22, the end portion 42b1 of the first extended electrode portion 42b located on the first lateral surface 2c side extends in the length direction L out of the region where the third outer electrode 7 is provided, and is located within the region where the first insulating coating portion 13, the second insulating coating portion 14, and the third outer electrode 7 are provided.

The end portion 42c1 of the second extended electrode portion 42c located on the second lateral surface 2d side extends in the length direction out of the region where the fourth outer electrode 8 is provided, and is located within the region where the third insulating coating portion 15, the fourth insulating coating portion 16, and the fourth outer electrode 8 are provided.

The first end portion 411 of the first inner electrode layer 41 extends in the width direction W out of the region on the first end surface 2e where the first outer electrode 5 is provided, and is located within the region where the first insulating coating portion 13, the first outer electrode 5, and the third insulating coating portion 15 are provided.

The second end portion 412 of the first inner electrode layer 41 extends in the width direction W out of the region on the second end surface 2f where the second outer electrode 6 is provided, and is located within the region where the second insulating coating portion 14, the second outer electrode 6, and the fourth insulating coating portion 16 are provided.

The multilayer ceramic capacitor 1E according to the fifth preferred embodiment is preferably manufactured in accordance with the method of manufacturing the multilayer ceramic capacitor according to the first preferred embodiment. In the fifth preferred embodiment, a step conforming to Step S10 (insulating coating portion forming step) according to the first preferred embodiment is performed prior to a step conforming to Step S9 (underlying electrode layer forming step).

Further, in the fifth preferred embodiment, a first transfer roller 104a and a second transfer roller 104b each including a wide first groove portion h1 are preferably used in the step conforming to Step S9 (underlying electrode layer forming step) according to the first preferred embodiment, and a first transfer roller 104c and a second transfer roller 104d each having a pair of second groove portions h2 provided at both ends in the direction of the rotation axis ax are preferably used in the step conforming to Step S10 (insulating coating portion forming step) according to the first preferred embodiment.

When the multilayer ceramic capacitor 1E according to the fifth preferred embodiment is manufactured, a process substantially similar to that of Step S1 to Step S8 according to the first preferred embodiment is performed. Next, the first insulating coating portion 13, the second insulating coating portion 14, the third insulating coating portion 15, and the fourth insulating coating portion 16 are formed by performing the step conforming to Step S10 (insulating coating portion forming step) according to the first preferred embodiment by using the first transfer roller 104c and the second transfer roller 104d described above. Next, the first outer electrode 5, the second outer electrode 6, the third outer electrode 7, and the fourth outer electrode 8 according to the fifth preferred embodiment are formed by performing the steps conforming to Step S9 (underlying electrode layer forming step) and Step S11 (plating layer forming step) according to the first preferred embodiment by using the first transfer roller 104a and the second transfer roller 104b described above. Thus, the multilayer ceramic capacitor 1E according to the fifth preferred embodiment is manufactured.

As described above, in the multilayer ceramic capacitor 1E according to the fifth preferred embodiment, the end portion located on the third outer electrode 7 side of the first insulating coating portion 13 is held in contact with the third outer electrode 7, and the end portion located on the first outer electrode 5 side of the first insulating coating portion 13 is held in contact with the first outer electrode 5. Further, the end portion located on the third outer electrode 7 side of the second insulating coating portion is held in contact with the third outer electrode 7, and the end portion located on the second outer electrode 6 side of the second insulating coating portion is held in contact with the second outer electrode 6. In addition, the end portion located on the fourth outer electrode 8 side of the third insulating coating portion 15 is held in contact with the fourth outer electrode 8, and the end portion located on the first outer electrode 5 side of the third insulating coating portion 15 is held in contact with the first outer electrode 5. Further, the end portion located on the fourth outer electrode 8 side of the fourth insulating coating portion 16 is held in contact with the fourth outer electrode 8, and the end portion located on the second outer electrode 6 side of the fourth insulating coating portion 16 is held in contact with the second outer electrode 6.

Thus, even when the end portion 42b1 of the first extended electrode portion 42b located on the first lateral surface 2c side extends in the length direction L out of the region where the third outer electrode 7 is provided and the end portion 42c1 of the second extended electrode portion 42c located on the second lateral surface 2d side extends in the length direction L out of the region where the fourth outer electrode 8 is provided, the extending portions are covered with the first insulating coating portion 13, the second insulating coating portion 14, the third insulating coating portion 15, and the fourth insulating coating portion 16 and is therefore prevented from being exposed to the outside. As a result, the reliability of the multilayer ceramic capacitor 1E is secured.

Further, by forming the end portion 42b1 of the first extended electrode portion 42b and the end portion 42c1 of the second extended electrode portion 42c as described above, it is possible to reduce the size of the loop defined by the path of the current flowing through the first inner electrode layer 41 from the first outer electrode 5 side, reaching the second inner electrode layer 42, and further flowing through the extended electrode portions 42b and 42c of the second inner electrode layer. As a result, the equivalent series inductance (ESL) is reduced.

At this time, the first outer electrode 5 and the second outer electrode 6 are provided so as not to reach the first lateral surface 2c and the second lateral surface 2d and therefore the lengths of the end portion 42b1 of the first extended electrode portion 42b and the end portion 42c1 of the second extended electrode portion 42c are set so as to become even closer to the lengths of the first lateral surface 2c and the second lateral surface 2d. Thus, the size of the loop described above is further reduced. As a result, the equivalent series inductance (ESL) is further reduced.

Note that the characteristic structures described in the first to fifth preferred embodiments and Modified Example 1 may be combined with each other as appropriate without departing from the spirit of the present invention. For example, in the second to fifth preferred embodiments, the order of overlap between the outer electrode and the insulating coating portion may be reversed as in Modified Example 1.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component, comprising:
a multilayer body including a first end surface and a second end surface located opposite each other in a length direction, a first lateral surface and a second lateral surface located opposite each other in a width direction perpendicular or substantially perpendicular to the length direction, and a first principal surface and a second principal surface located opposite each other in a thickness direction perpendicular or substantially perpendicular to the length direction and the width direction;
a first outer electrode that reaches the first principal surface, the second principal surface, the first lateral surface, and the second lateral surface from the first end surface;
a second outer electrode that reaches the first principal surface, the second principal surface, the first lateral surface, and the second lateral surface from the second end surface;
a third outer electrode that is provided on the first lateral surface so as to be located between the first end surface and the second end surface in the length direction and reaches the first principal surface and the second principal surface from the first lateral surface;
a fourth outer electrode that is provided on the second lateral surface so as to be located between the first end surface and the second end surface in the length direction and reaches the first principal surface and the second principal surface from the second lateral surface;
a pair of first insulating coating portions that is provided so that the third outer electrode is located therebetween in the length direction and reaches the first principal surface and the second principal surface from the first lateral surface; and
a pair of second insulating coating portions that is provided so that the fourth outer electrode is located therebetween in the length direction and reaches the first principal surface and the second principal surface from the second lateral surface; wherein
the multilayer body includes a plurality of dielectric layers and a plurality of inner electrode layers alternately laminated in a laminating direction that is the thickness direction;
the plurality of inner electrode layers include:
a plurality of first inner electrode layers connected to the first outer electrode and the second outer electrode; and
a plurality of second inner electrode layers connected to the third outer electrode and the fourth outer electrode;
the pair of first insulating coating portions is in at least one of a state in which inner end portions of the pair of first insulating coating portions in the length direction are in contact with the third outer electrode and a state in which outer end portions of the pair of first insulating coating portions in the length direction are in contact with the first outer electrode and the second outer electrode;
the pair of second insulating coating portions is located opposite the pair of first insulating coating portions in the width direction;
the pair of second insulating coating portions is in at least one of a state in which inner end portions of the pair of second insulating coating portions in the length direction are in contact with the fourth outer electrode and a state in which outer end portions of the pair of second insulating coating portions in the length direction are in contact with the first outer electrode and the second outer electrode;
the pair of first insulating coating portions are provided only on the first principal surface, the second principal surface, and the first lateral surface; and
the pair of second insulating coating portions are provided only on the first principal surface, the second principal surface, and the second lateral surface.

2. The electronic component according to claim 1, wherein
the pair of first insulating coating portions is in the state in which the inner end portions of the pair of first insulating coating portions in the length direction are in contact with the third outer electrode; and
the pair of second insulating coating portions is in the state in which the inner end portions of the pair of second insulating coating portions in the length direction are in contact with the fourth outer electrode.

3. The electronic component according to claim 2, wherein
the second inner electrode layer includes:
a first opposed electrode portion that faces the first inner electrode layer;
a first extended electrode portion that extends from the first opposed electrode portion to the first lateral surface so as to be connected to the third outer electrode; and
a second extended electrode portion that extends from the first opposed electrode portion to the second lateral surface so as to be connected to the fourth outer electrode;
an end portion of the first extended electrode portion located on the first lateral surface side extends in the length direction out of a region where the third outer electrode is provided, and is located within a region where the pair of first insulating coating portions and the third outer electrode are provided; and
an end portion of the second extended electrode portion located on the second lateral surface side extends in the length direction out of a region where the fourth outer electrode is provided, and is located within a region where the pair of second insulating coating portions and the fourth outer electrode are provided.

4. The electronic component according to claim 2, wherein
the inner end portions of the pair of first insulating coating portions in the length direction cover the third outer electrode; and
the inner end portions of the pair of second insulating coating portions in the length direction cover the fourth outer electrode.

5. The electronic component according to claim 2, wherein
the inner end portions of the pair of first insulating coating portions in the length direction are covered with the third outer electrode; and
the inner end portions of the pair of second insulating coating portions in the length direction are covered with the fourth outer electrode.

6. The electronic component according to claim 1, wherein
the pair of first insulating coating portions is in the state in which the outer end portions of the pair of first insulating coating portions in the length direction are in contact with the first outer electrode and the second outer electrode; and
the pair of second insulating coating portions is in the state in which the outer end portions of the pair of second insulating coating portions in the length direction are in contact with the first outer electrode and the second outer electrode.

7. The electronic component according to claim 6, wherein
the first inner electrode layer includes:
a second opposed electrode portion that faces the second inner electrode layer;
a third extended electrode portion that extends from the second opposed electrode portion to the first end surface so as to be connected to the first outer electrode; and
a fourth extended electrode portion that extends from the second opposed electrode portion to the second end surface so as to be connected to the second outer electrode;
the third extended electrode portion includes:
a first extended end portion that is extended to the first lateral surface; and
a second extended end portion that is extended to the second lateral surface;
the fourth extended electrode portion includes:
a third extended end portion that is extended to the first lateral surface; and
a fourth extended end portion that is extended to the second lateral surface;
the first extended end portion is located within a region on the first lateral surface where one first insulating coating portion out of the pair of first insulating coating portions which is located on the first end surface side and the first outer electrode are provided;
the second extended end portion is located within a region on the second lateral surface where one second insulating coating portion out of the pair of second insulating coating portions which is located on the first end surface side and the first outer electrode are provided;
the third extended end portion is located within a region on the first lateral surface where the other first insulating coating portion out of the pair of first insulating coating portions which is located on the second end surface side and the second outer electrode are provided; and
the fourth extended end portion is located within a region on the second lateral surface where the other second insulating coating portion out of the pair of second insulating coating portions which is located on the second end surface side and the second outer electrode are provided.

8. The electronic component according to claim 6, wherein
one of the outer end portions of the pair of first insulating coating portions in the length direction which is located on the first outer electrode side covers the first outer electrode, and another one of the outer end portions of the pair of first insulating coating portions in the length direction which is located on the second outer electrode side covers the second outer electrode; and
one of the outer end portions of the pair of second insulating coating portions in the length direction which is located on the first outer electrode side covers the first outer electrode, and another one of the outer end portions of the pair of second insulating coating portions in the length direction which is located on the second outer electrode side covers the second outer electrode.

9. The electronic component according to claim 6,
one of the outer end portions of the pair of first insulating coating portions in the length direction which is located on the first outer electrode side is covered with the first outer electrode, and another one of the outer end portions of the pair of first insulating coating portions in the length direction which is located on the second outer electrode side is covered with the second outer electrode; and
one of the outer end portions of the pair of second insulating coating portions in the length direction which is located on the first outer electrode side is covered with the first outer electrode, and another one of the outer end portions of the pair of second insulating coating portions in the length direction which is located on the second outer electrode side is covered with the second outer electrode.

10. The electronic component according to claim 1, wherein
the pair of first insulating coating portions is in the state in which the inner end portions of the pair of first insulating coating portions in the length direction are in contact with the third outer electrode and the state in which the outer end portions of the pair of first insulating coating portions in the length direction are in contact with the first outer electrode and the second outer electrode; and
the pair of second insulating coating portions is in the state in which the inner end portions of the pair of second insulating coating portions in the length direction are in contact with the fourth outer electrode and the state in which the outer end portions of the pair of second insulating coating portions in the length direction are in contact with the first outer electrode and the second outer electrode.

11. The electronic component according to claim 10, wherein
the second inner electrode layer includes:
a first opposed electrode portion that faces the first inner electrode layer;

a first extended electrode portion that extends from the first opposed electrode portion to the first lateral surface so as to be connected to the third outer electrode; and a second extended electrode portion that extends from the first opposed electrode portion to the second lateral surface so as to be connected to the fourth outer electrode;

an end portion of the first extended electrode portion located on the first lateral surface side is located within a region where the pair of first insulating coating portions and the third outer electrode are provided; and an end portion of the second extended electrode portion located on the second lateral surface side is located within a region where the pair of second insulating coating portions and the fourth outer electrode are provided.

12. The electronic component according to claim 10, wherein the inner end portions of the pair of first insulating coating portions in the length direction cover the third outer electrode;

one of the outer end portions of the pair of first insulating coating portions in the length direction which is located on the first outer electrode side covers the first outer electrode, and another one of the outer end portions of the pair of first insulating coating portions in the length direction which is located on the second outer electrode side covers the second outer electrode;

the inner end portions of the pair of second insulating coating portions in the length direction cover the fourth outer electrode; and one of the outer end portions of the pair of second insulating coating portions in the length direction which is located on the first outer electrode side covers the first outer electrode, and another one of the outer end portions of the pair of second insulating coating portions in the length direction which is located on the second outer electrode side covers the second outer electrode.

13. The electronic component according to claim 10, wherein the inner end portions of the pair of first insulating coating portions in the length direction are covered with the third outer electrode;

one of the outer end portions of the pair of first insulating coating portions in the length direction which is located on the first outer electrode side is covered with the first outer electrode, and another one of the outer end portions of the pair of first insulating coating portions in the length direction which is located on the second outer electrode side is covered with the second outer electrode;

the inner end portions of the pair of second insulating coating portions in the length direction are covered with the fourth outer electrode; and one of the outer end portions of the pair of second insulating coating portions in the length direction which is located on the first outer electrode side is covered with the first outer electrode, and another one of the outer end portions of the pair of second insulating coating portions in the length direction which is located on the second outer electrode side is covered with the second outer electrode.

14. The electronic component according to claim 1, wherein maximum thicknesses of the pair of first insulating coating portions and the pair of second insulating coating portions are larger than a maximum thickness of the first outer electrode, a maximum thickness of the second outer electrode, a maximum thickness of the third outer electrode, and a maximum thickness of the fourth outer electrode.

15. The electronic component according to claim 1, wherein each of the pair of first insulating coating portions and the pair of second insulating coating portions includes a material containing a dielectric ceramic, a resin, or a glass.

16. The electronic component according to claim 15, wherein each of the pair of first insulating coating portions and the pair of second insulating coating portions includes a material containing the dielectric ceramic; and the dielectric ceramic includes $BaTiO_3$, $CaTiO_3$, $SrTiO_3$, or $CaZrO_3$.

17. The electronic component according to claim 15, wherein each of the pair of first insulating coating portions and the pair of second insulating coating portions includes a material containing the resin; and the resin includes an epoxy based resin or a polyimide based resin.

18. The electronic component according to claim 15, wherein each of the pair of first insulating coating portions and the pair of second insulating coating portions includes a material containing the glass; and the glass includes Ba or Sr.

19. An electronic component, comprising:

a multilayer body including a first end surface and a second end surface located opposite each other in a length direction, a first lateral surface and a second lateral surface located opposite each other in a width direction perpendicular or substantially perpendicular to the length direction, and a first principal surface and a second principal surface located opposite each other in a thickness direction perpendicular or substantially perpendicular to the length direction and the width direction;

a first outer electrode that reaches the first principal surface and the second principal surface from the first end surface;

a second outer electrode that reaches the first principal surface and the second principal surface from the second end surface;

a third outer electrode that reaches the first principal surface and the second principal surface from the first lateral surface;

a fourth outer electrode that reaches the first principal surface and the second principal surface from the second lateral surface;

a first insulating coating portion that is provided at a first ridge portion between the first end surface and the first lateral surface;

a second insulating coating portion that is provided at a second ridge portion between the second end surface and the first lateral surface;

a third insulating coating portion that is provided at a third ridge portion between the first end surface and the second lateral surface; and a fourth insulating coating portion that is provided at a fourth ridge portion between the second end surface and the second lateral surface; wherein the multilayer body includes a plurality of dielectric layers and a plurality of inner electrode layers alternately laminated in a laminating direction that is the thickness direction;

the plurality of inner electrode layers includes:
a plurality of first inner electrode layers connected to the first outer electrode and the second outer electrode; and
a plurality of second inner electrode layers connected to the third outer electrode and the fourth outer electrode;
the first insulating coating portion directly contacts the first end surface and the first lateral surface and extends to the first end surface, the first lateral surface, the first principal surface, and the second principal surface;
the second insulating coating portion directly contacts the second end surface and the first lateral surface and extends to the second end surface, the first lateral surface, the first principal surface, and the second principal surface;
the third insulating coating portion directly contacts the first end surface and the second lateral surface and extends to the first end surface, the second lateral surface, the first principal surface, and the second principal surface;
the fourth insulating coating portion directly contacts the second end surface and the second lateral surface and extends to the second end surface, the second lateral surface, the first principal surface, and the second principal surface;
the first insulating coating portion and the second insulating coating portion are in at least one of a state in which end portions which are located on the third outer electrode side are in contact with the third outer electrode and a state in which an end portion of the first insulating coating portion which is located on the first outer electrode side is in contact with the first outer electrode and an end portion of the second insulating coating portion which is located on the second outer electrode side is in contact with the second outer electrode; and
the third insulating coating portion and the fourth insulating coating portion are in at least one of a state in which end portions which are located on the fourth outer electrode side are in contact with the fourth outer electrode and a state in which an end portion of the third insulating coating portion which is located on the first outer electrode side is in contact with the first outer electrode and an end portion of the fourth insulating coating portion which is located on the second outer electrode side is in contact with the second outer electrode.

20. The electronic component according to claim 19, wherein
the end portion of the first insulating coating portion which is located on the third outer electrode side is in contact with the third outer electrode, and the end portion of the first insulating coating portion which is located on the first outer electrode side is in contact with the first outer electrode;
the end portion of the second insulating coating portion which is located on the third outer electrode side is in contact with the third outer electrode, and the end portion of the second insulating coating portion which is located on the second outer electrode side is in contact with the second outer electrode;
the end portion of the third insulating coating portion which is located on the fourth outer electrode side is in contact with the fourth outer electrode, and the end portion of the third insulating coating portion which is located on the first outer electrode side is in contact with the first outer electrode; and
the end portion of the fourth insulating coating portion which is located on the fourth outer electrode side is in contact with the fourth outer electrode, and the end portion of the fourth insulating coating portion which is located on the second outer electrode side is in contact with the second outer electrode.

21. The electronic component according to claim 20, wherein
the second inner electrode layer includes:
a first opposed electrode portion that faces the first inner electrode layer;
a first extended electrode portion that extends from the first opposed electrode portion to the first lateral surface so as to reach the third outer electrode; and
a second extended electrode portion that extends from the first opposed electrode portion to the second lateral surface so as to reach the fourth outer electrode;
an end portion of the first extended electrode portion located on the first lateral surface side extends in the length direction out of a region where the third outer electrode is provided, and is located within a region where the first insulating coating portion, the second insulating coating portion, and the third outer electrode are provided; and
an end portion of the second extended electrode portion located on the second lateral surface side extends in the length direction out of a region where the fourth outer electrode is provided, and is located within a region where the third insulating coating portion, the fourth insulating coating portion, and the fourth outer electrode are provided.

22. The electronic component according to claim 20, wherein
the first inner electrode layer includes:
a first end portion that is extended to the first end surface; and
a second end portion that is extended to the second end surface; wherein
the first end portion extends in the width direction out of a region on the first end surface where the first outer electrode is provided, and is located within a region where the first insulating coating portion, the first outer electrode, and the third insulating coating portion are provided; and
the second end portion extends in the width direction out of a region on the second end surface where the second outer electrode is provided, and is located within a region where the second insulating coating portion, the second outer electrode, and the fourth insulating coating portion are provided.

23. The electronic component according to claim 20, wherein
the end portions on the first end surface side of the first insulating coating portion and the third insulating coating portion are covered with the first outer electrode;
the end portions on the second end surface side of the second insulating coating portion and the fourth insulating coating portion are covered with the second outer electrode;
the end portions on the first lateral surface side of the first insulating coating portion and the second insulating coating portion are covered with the third outer electrode; and the end portions on the second lateral surface side of the third insulating coating portion and the fourth insulating coating portion are covered with the fourth outer electrode.

24. The electronic component according to claim 20, wherein the end portions on the first end surface side of the first insulating coating portion and the third insulating coating portion cover the first outer electrode;

the end portions on the second end surface side of the second insulating coating portion and the fourth insulating coating portion cover the second outer electrode;

the end portions on the first lateral surface side of the first insulating coating portion and the second insulating coating portion cover the third outer electrode; and the end portions on the second lateral surface side of the third insulating coating portion and the fourth insulating coating portion cover the fourth outer electrode.

25. The electronic component according to claim 19, wherein each of the first insulating coating portion, the second insulating coating portion, the third insulating coating portion, and the fourth insulating coating portion includes a material containing a dielectric ceramic, a resin, or a glass.

26. The electronic component according to claim 25, wherein each of the first insulating coating portion, the second insulating coating portion, the third insulating coating portion, and the fourth insulating coating portion includes a material containing the dielectric ceramic; and the dielectric ceramic includes $BaTiO_3$, $CaTiO_3$, $SrTiO_3$, or $CaZrO_3$.

27. The electronic component according to claim 25, wherein each of the first insulating coating portion, the second insulating coating portion, the third insulating coating portion, and the fourth insulating coating portion includes a material containing the resin; and the resin includes an epoxy based resin or a polyimide based resin.

28. The electronic component according to claim 25, wherein each of the first insulating coating portion, the second insulating coating portion, the third insulating coating portion, and the fourth insulating coating portion includes a material containing the glass; and the glass includes Ba or Sr.

* * * * *